United States Patent
Guemmer

(10) Patent No.: US 10,030,521 B2
(45) Date of Patent: Jul. 24, 2018

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 672 days.

(21) Appl. No.: 14/626,640

(22) Filed: Feb. 19, 2015

(65) Prior Publication Data
US 2015/0240647 A1 Aug. 27, 2015

(30) Foreign Application Priority Data
Feb. 27, 2014 (DE) ......... 10 2014 203 603

(51) Int. Cl.
*F01D 5/06* (2006.01)
*F01D 5/14* (2006.01)
*F01D 9/04* (2006.01)

(52) U.S. Cl.
CPC .............. *F01D 5/142* (2013.01); *F01D 5/06* (2013.01); *F01D 5/146* (2013.01); *F01D 9/041* (2013.01); *F05D 2250/74* (2013.01); *Y02T 50/673* (2013.01)

(58) Field of Classification Search
CPC . F01D 5/14; F01D 5/142; F01D 5/146; F04D 29/181; F04D 29/324; F04D 29/541; F04D 29/544
See application file for complete search history.

(56) References Cited

U.S. PATENT DOCUMENTS 8,534,997 B2 9/2013 Guemmer
8,573,941 B2 * 11/2013 Hoeger .................. F01D 5/142
 415/181

(Continued)

FOREIGN PATENT DOCUMENTS

DE 102009013399 9/2010
DE 102011084125 4/2013

(Continued)

OTHER PUBLICATIONS

European Search Report dated Jul. 23, 2015 from related European Application No. 15156110.7.

(Continued)

*Primary Examiner* — Jason Shanske
*Assistant Examiner* — Christopher R Legendre
(74) *Attorney, Agent, or Firm* — Shuttleworth & Ingersoll, PLC; Timothy J. Klima

(57) ABSTRACT

The present invention relates to a blade row group arrangeable in a main flow path of a fluid-flow machine and including N adjacent member blade rows firmly arranged relative to one another in both the meridional direction (m) and the circumferential direction (u), with the number N of the member blade rows being greater than/equal to 2 and (i) designating the running index with values between 1 and N. Here, a front member blade row with front blades (i) having a leading edge VK(i) and a trailing edge HK(i) as well as a rear member blade row with rear blades (i+1) having a leading edge VK(i+1) and a trailing edge HK(i+1) are provided.

21 Claims, 9 Drawing Sheets

(56) References Cited

U.S. PATENT DOCUMENTS

| | | | |
|---|---|---|---|
| 2010/0303629 A1* | 12/2010 | Guemmer | F01D 5/146 |
| | | | 416/223 R |
| 2011/0318172 A1 | 12/2011 | Hoeger | |
| 2013/0209223 A1 | 8/2013 | Gomez et al. | |
| 2013/0209224 A1 | 8/2013 | Gomez et al. | |
| 2013/0209241 A1 | 8/2013 | Gomez et al. | |
| 2015/0240647 A1* | 8/2015 | Guemmer | F01D 5/06 |
| | | | 415/209.1 |

FOREIGN PATENT DOCUMENTS

| | | |
|---|---|---|
| EP | 0823540 | 2/1998 |
| EP | 2261463 | 12/2010 |
| GB | 628263 | 8/1949 |
| GB | 872228 | 7/1961 |

OTHER PUBLICATIONS

Willy J. G. Braunling, Aircraft Engines, ISBN 978-3-540-76368-0, Springer, pp. 604, 643, 967, 968 [See attached concise statement of relevance].

German Search Report dated Feb. 27, 2014 from counterpart German App No. 10 2014 203 603.8.

* cited by examiner

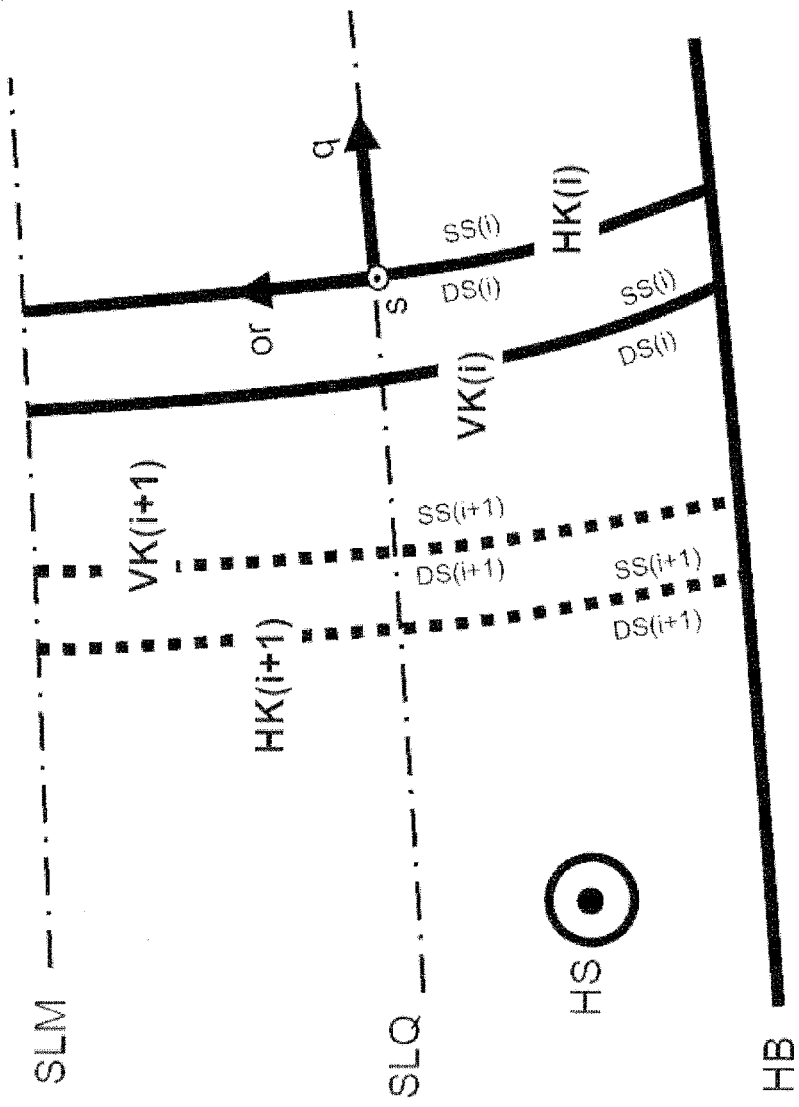

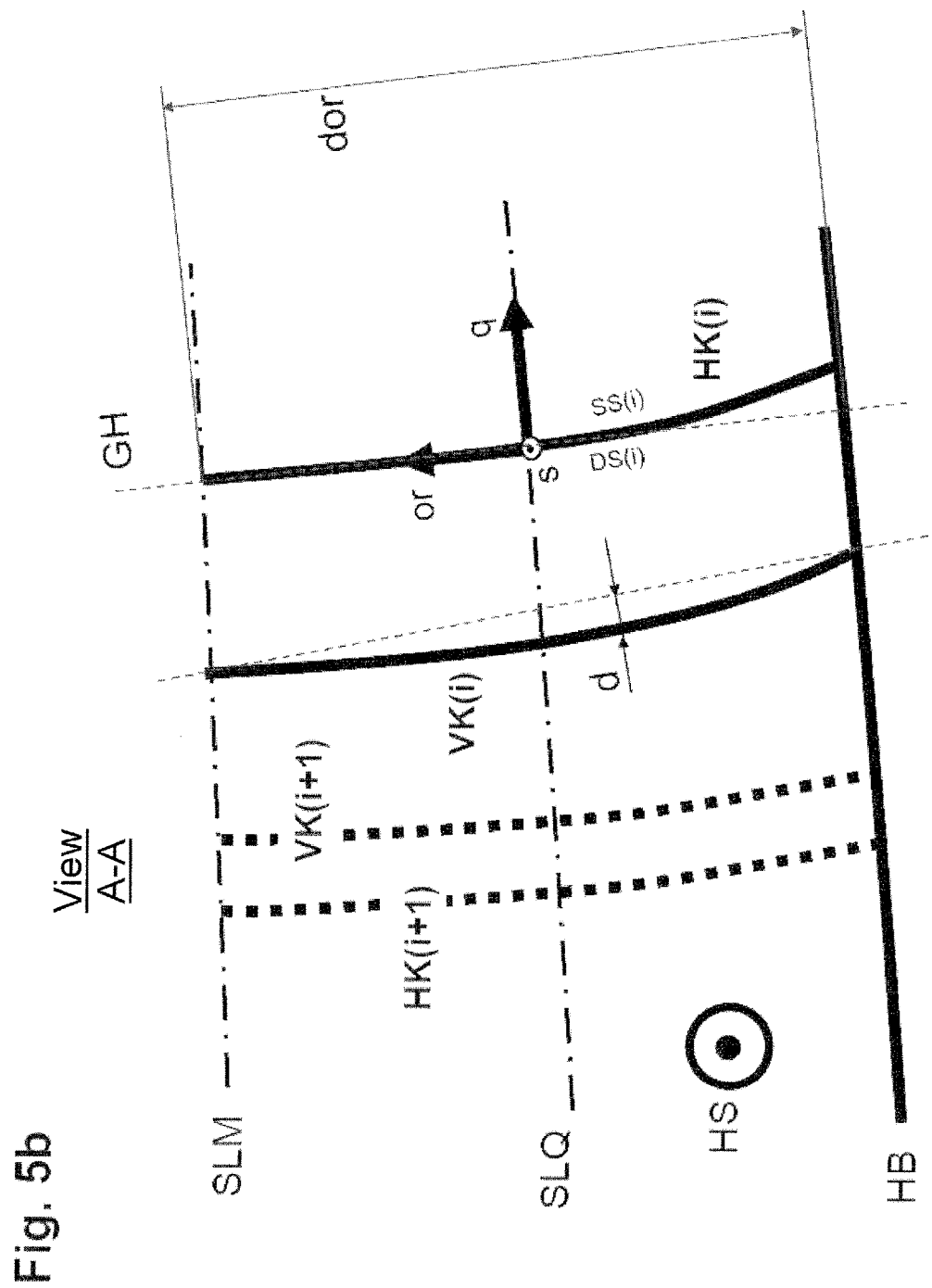

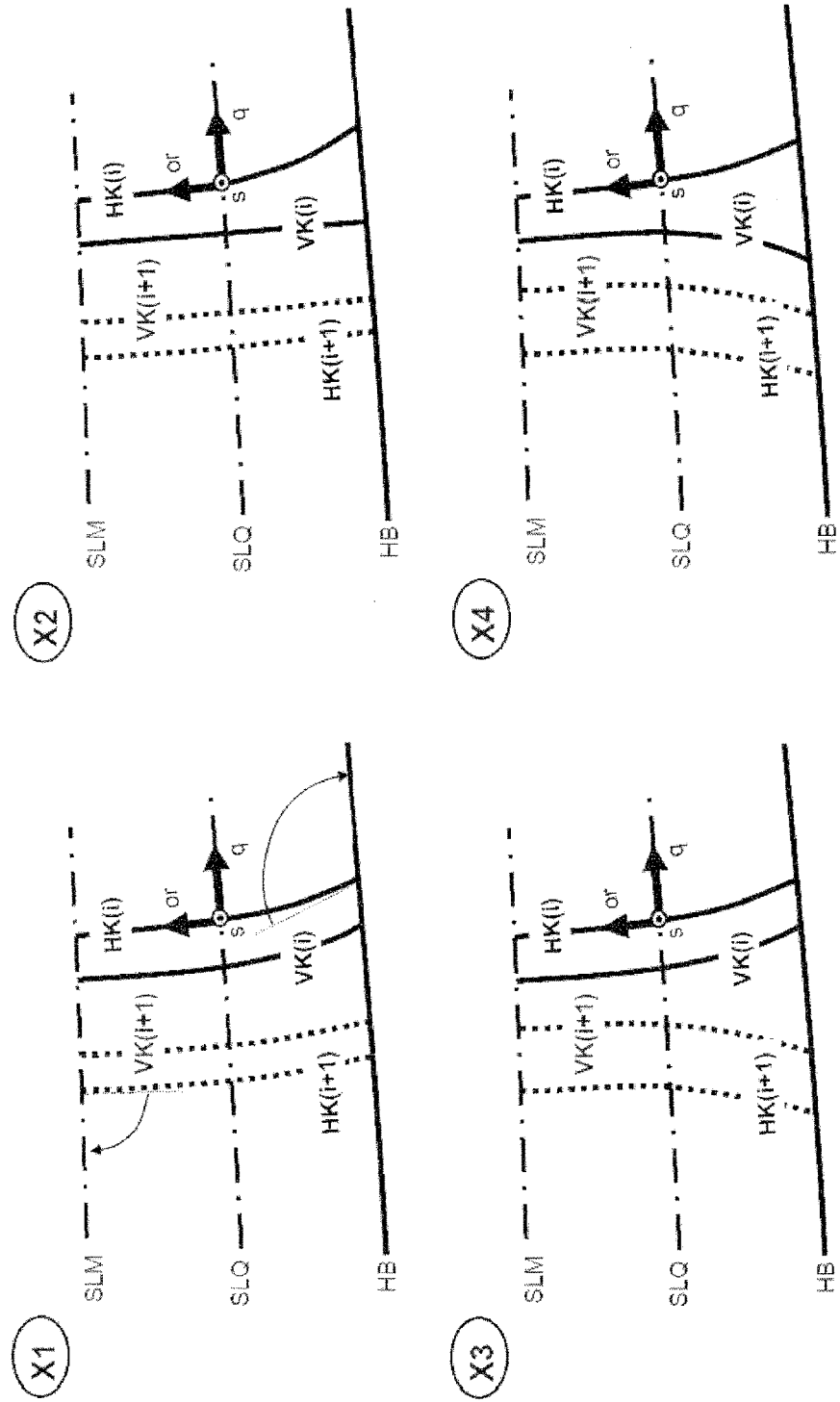

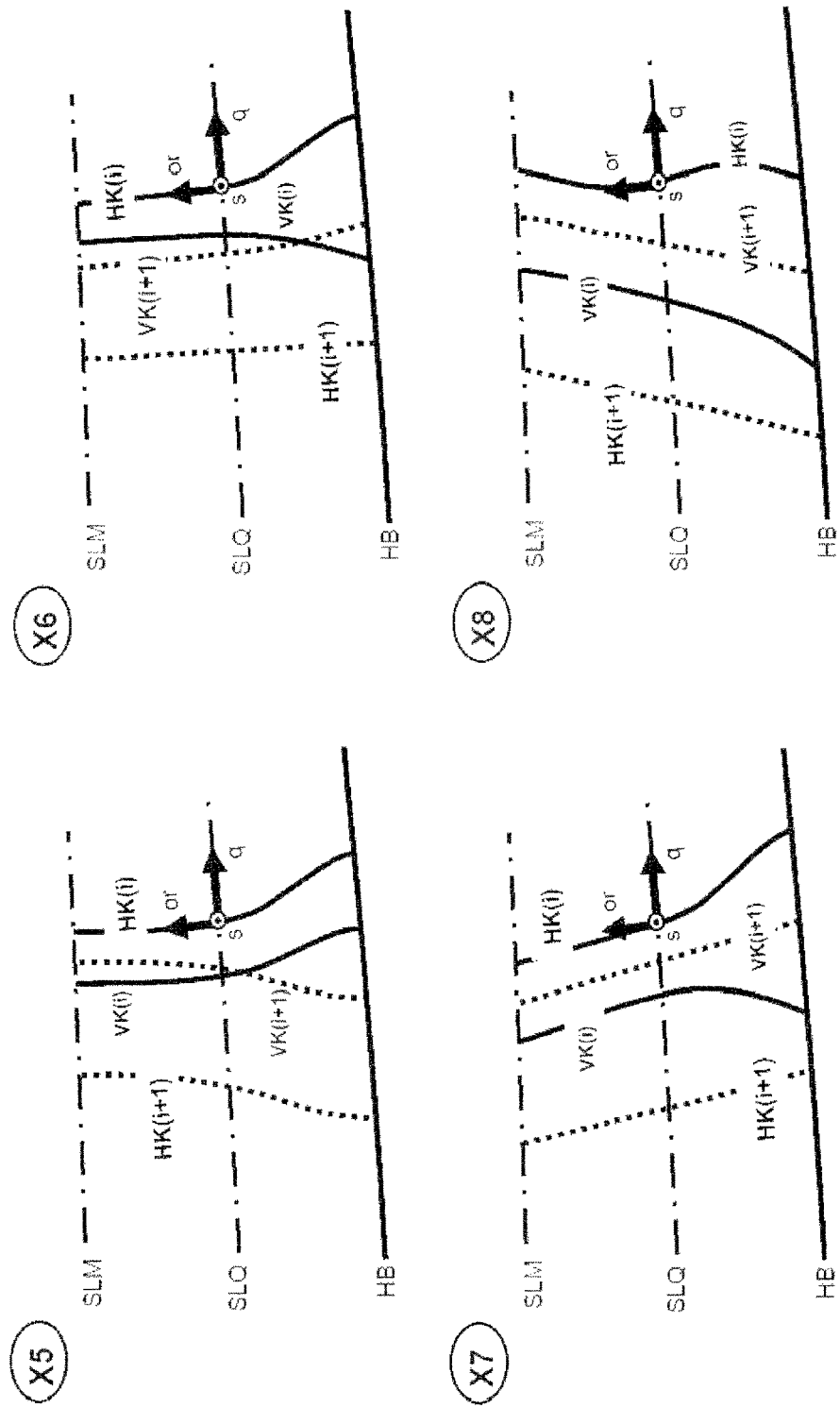

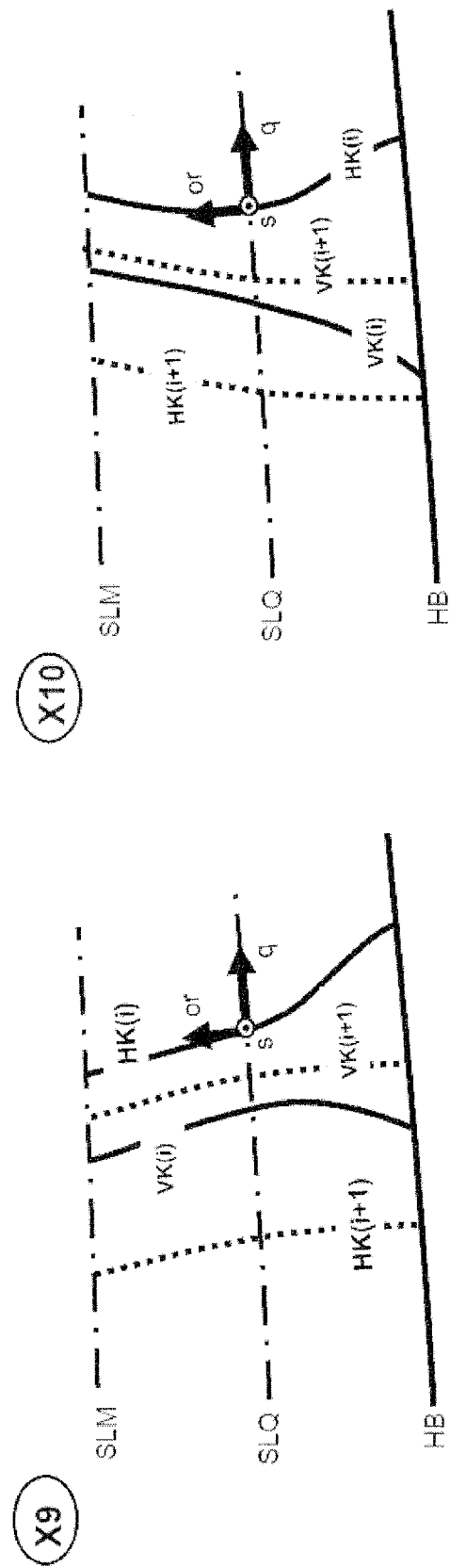

GROUP OF BLADE ROWS

CROSS-REFERENCE TO RELATED APPLICATION

This application claims priority to German Patent Application No. 10 2014 203 603.8 filed on Feb. 27, 2014, the entirety of which is incorporated by reference herein.

BACKGROUND

This invention relates to a blade row group.

The aerodynamic loadability and the efficiency of fluid-flow machines, in particular blowers, compressors, turbines, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid-flow machines are arrangements with double-row stator wheels, usually employed as outlet guide vane assemblies in compressors, or also double-row rotor arrangements in which directly adjacent rotors operate counter-rotatingly, or in which two directly adjacent rotor blade rows are attached to a common drum. A fluid-flow machine of this type is known for example from EP 2 261 463 A2. With these arrangements, and in particular with those having several, directly adjacent blade rows firmly arranged relative to one another (for example several rotor blade rows on the same drum, or several stator vane rows), severe boundary layer separation occurs at higher aerodynamic loading in the boundary zone of the main flow path, i.e. at the hub or casing contour.

The problems in the edge areas are primarily due to the fact that the favourable arrangement of two adjacent blade edges of a blade row group in the center of the main flow path has an unfavourable effect in the vicinity of the flow path boundary. Also, design rules known from individual blade rows are not applicable. New rules must be devised for blade row groups. In particular, the required flow deflection may quickly be so high either in parts of the blade height or along the entire blade height that the conventional arrangement of a blade row group leads to a separated boundary layer flow in the edge areas of the main flow path on the hub and/or the casing walls.

It is known from US 2013/0209223 A1 to vary the meridional overlap between front and rear blades of a blade row group between the center of the main flow path and the main flow path boundary. From US 2013/0209224 A1 it is known to vary the degree of overlap between front and rear blades of a blade row group as well as the distance of adjacent edges of the front and rear blades between the center of the main flow path and the main flow path boundary.

A variation of the overlap and of the distance is usually obtained with every configuration of a blade row group, without this necessarily having an advantageous effect on the flow. US 2013/0209241 A1 and US 2013/0209224 A1 describe most different possibilities for variation, without using aerodynamically significant parameters or furnishing the engineer with evaluations of the possible variations. No technical teachings relating to stipulation of the precise shape for all blade edges of two adjacent member blade rows are provided, although these are of crucial importance for favourably influencing the overall flow behaviour. US 2013/0209241 A1 deals with the edge spacing of adjacent member blade rows in the circumferential plane (axial view). The flow direction in blade rows has however a sometimes considerable flow swirl component, so that the blading may be considerably inclined relative to the axial direction. Crucial for the aerodynamic behaviour, however, is a fixing of the blade edges in a view perpendicular and parallel to the blade profile chord. A blade edge visible in the axial plane can therefore be generated by an infinite number of different blade edge shapes fixed in the aerodynamically relevant chord and chord-orthogonal directions. It cannot therefore clearly describe the shape of the blade edges, and accordingly cannot solve the aerodynamic problem of achieving an advantageous effect on the flow.

SUMMARY

An object underlying the present invention is to provide a blade row group that achieves a favourable flow behaviour due to the fixing of edge shapes and relationships between the edges of two adjacent member blade rows both in the center area and in the edge areas of the main flow path.

It is a particular object of the present invention to provide solution to the above problems by a blade row group having the features as described herein.

Accordingly, the solution in accordance with the invention provides a blade row group consisting of at least two adjacent blade rows firmly arranged relative to one another (several co-rotating rotor blade rows or several stator vane rows), which can be arranged in a main flow path of a fluid-flow machine. Here, the leading edge of at least one blade of the rear member blade row is provided in the vicinity of a blade of the front member blade row, where between the pressure side of the blade and the suction side of the blade a secondary passage can be formed, if applicable.

Since the blade edge shapes of the blades involved and the shapes of the individual edges relative to one another are highly relevant to favourable flow guidance and to blade height-dependent exploitation of the potential effects in the aerodynamically important interference area of the two member blade rows, it is provided in accordance with the invention that in the area between the mean meridional flow line and one of the main flow path boundaries in a view perpendicular to a third coordinate direction and within an angular range of +/−45° about a first coordinate direction the blade leading edge of a front blade and both blade edges of a rear blade are arranged at least in a partial area between the mean meridional flow line and the main flow path boundary on the pressure side of the blade trailing edge of the front blade.

Here, the first and the third coordinate direction are defined as follows: an auxiliary coordinate system having a first, a second and a third coordinate direction is provided, with the first coordinate direction facing downstream at the angle lambdam relative to the meridional direction, the second coordinate direction, perpendicular to the first coordinate direction, facing away from the pressure side of the front blade, and the third coordinate direction being perpendicular to the first coordinate direction and to the second coordinate direction.

The solution in accordance with the present invention enables a favourable flow guidance and blade height-dependent exploitation of the potential effects in the aerodynamically important interference area of adjacent member blade rows, in that it provides common features of several blade edges regarding their position, i.e. their pressure-side arrangement relative to the position of the blade trailing edge of the front blade. Further common features of several blade edges may exist as regards the shape of the blade edges.

In accordance with an embodiment of the present invention, the above defined relationships of the blade edges apply in a view perpendicular to the third coordinate direction and within an angular range of +/−20° about a first coordinate direction. In a further embodiment of the present invention, the above defined relationships apply in a view of the blade edges perpendicular to the third coordinate direction and exactly along the first coordinate direction.

In accordance with an embodiment of the present invention, it is provided that at least two blade edges of the blades in a blade row group have a qualitative equality in respect of their edge type. A qualitative equality of two blade edges exists here when the blade edges are of the same edge type or are, when mirror-inverted, of the same edge type (i.e. after mirror inversion of one of two edges considered, the two edges considered are of the same edge type). The blade edges can here each be associated with one edge type in a plurality of edge types that are defined by the curvature of the edge contour and/or by the number of curvature changes of the blade edge and/or by the degree of bulge of the blade edge. In particular, the following edge types are defined:

Edge type A: there is a substantially linear course, with a very small degree of bulge of WG<0.003.

Edge type B: there is a slightly curved course, with a small degree of bulge of 0.003<WG<0.01.

Edge type C: there is an at least partially curved course, without curvature change and with a degree of bulge of WG>0.01 and with a section having a concave curvature in the upstream direction.

Edge type D: there is an at least partially curved course, without curvature change and with a degree of bulge of WG>0.01 and with a section having a convex curvature in the upstream direction.

Edge type E: there is an at least partially curved course, with a curvature change and with a degree of bulge of WG>0.01 and with a section having a concave curvature in the upstream direction between the curvature change point and the main flow path boundary HB.

Edge type F: there is an at least partially curved course, with a curvature change and with a degree of bulge of WG>0.01 and with a section having a convex curvature in the upstream direction between the curvature change point and the main flow path boundary HB.

Edge type G: there is an at least partially curved course, with two curvature changes and with a degree of bulge of WG>0.01 and with a section having a concave curvature in the upstream direction between the two curvature change points.

Edge type H: there is an at least partially curved course, with two curvature changes and with a degree of bulge of WG>0.01 and with a section having a convex curvature in the upstream direction between the two curvature change points.

In accordance with an embodiment of the invention, it is provided that in the blade row group in accordance with the invention the trailing edge of the front blade is of the edge type D. In a further embodiment it is provided that the trailing edge of the front blade is of the edge type E.

The present invention relates to blades of fluid-flow machines, such as blowers, compressors, pumps, fans and turbines of the axial, semi-axial and radial type using gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating from stage to stage. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

FIG. 5a shows definitions in accordance with the present invention in view A-A from FIG. 4.

FIG. 5b shows further definitions in accordance with the present invention in view A-A from FIG. 4.

FIG. 6a shows blade group arrangements in accordance with the present invention in view A-A.

FIG. 6b shows further blade group arrangements in accordance with the present invention in view A-A.

FIG. 6c shows further blade group arrangements in accordance with the present invention in view A-A.

DETAILED DESCRIPTION

Figure 1:
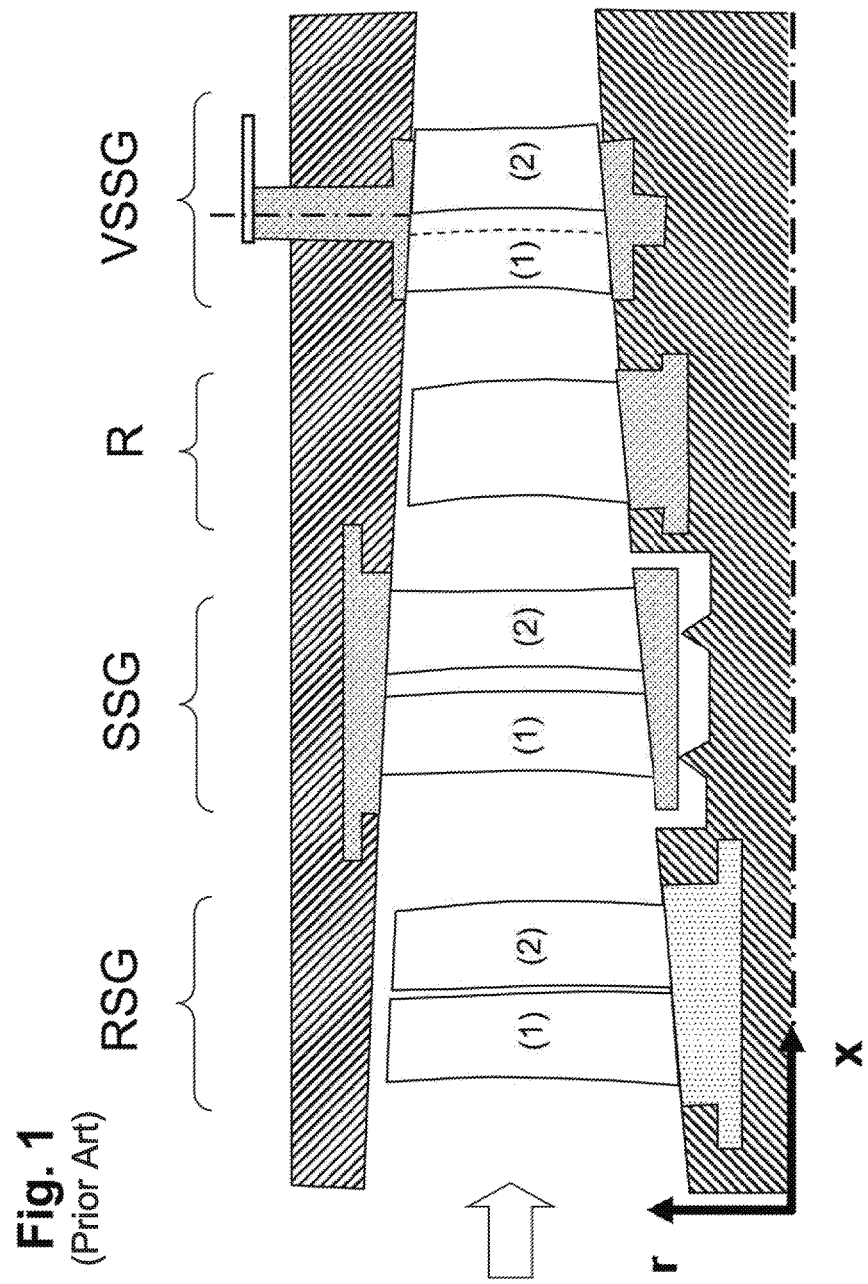
FIG. 1 shows several blade row groups in accordance with the state of the art.

A conventional blade row group according to the state of the art, as shown in FIG. 1, has no special features in respect of the shape of the blade edges. In particular, there is no special shape of the four blade edges arising from profile depth variations or particular relationships between individual blade edges. There are no further design features which could however be innovatively developed by a more complex exploitation of the arrangement as a blade row group. A blade row group as considered here has, unlike an individual blade row, a relatively far higher load on the side wall boundary layers, which has to be compensated for by specific additional measures. A special blade edge shape and matching of the edges relative to one another in the area of the blade ends under the special aerodynamic effect of an arrangement as a blade row group therefore offers a way of extending the operating range of blade row groups.

FIG. 1 shows, in the meridional plane established by the axial direction x and the radial direction r, several blade row groups, with each of the blade row groups including two similar member blade rows showing no variation in their relative arrangement to one another (both circumferentially and meridionally). This relates therefore to double-row stator wheels or rotor wheels.

Accordingly, a rotor blade row group RSG includes two rotor blade rows rotating at the same speed and being connected to each other; the first member of the group is marked (1) and the second member of the group is marked (2). A stator vane row group SSG includes two directly adjacent stationary stator vane rows (1) and (2).

A variable stator vane row group VSSG includes two directly adjacent stator vane rows (1) and (2), with one vane of the front row and one vane of the rear row being each provided on a common rotary base and thus jointly settable about the rotary axis.

All blade row groups according to the state of the art have in common that there is no targeted shaping of the blade edges, and no advantageous correlating of the individual blade edge shapes. Also, the latter are usually viewed in the meridional plane (x-r) or the axial plane (r-u), which do not permit any conclusions to be drawn about properties in the aerodynamically crucial reference system parallel or perpendicular to the profile chord of a blade section. It is therefore possible for example that two blade edges intersecting in the axial plane (x-r) have no contact or intersection point in the chord-parallel view. Furthermore, the state of the art lacks any technical teaching on the stipulation of important quantities in the viewing planes (parallel or perpendicular to the profile chord) relevant for the flow-mechanical problems.

The solutions according to the state of the art are either unserviceable due to the lack of relevant criteria or are disadvantageous for the flow in the vicinity of the main flow path boundary (hub or casing).

The precise stipulation in accordance with the invention must accordingly be made in a system related to a profile chord direction. This method is described in detail further below. Each of the blade row groups in accordance with the invention also includes here two member blade rows that are similar and do not change their positions relative to one another.

Accordingly, a rotor blade row group RSG in accordance with the present invention includes at least two rotor blade rows rotating at the same speed and being connected to each other. A stator vane row group SSG in accordance with the present invention includes at least two directly adjacent stationary stator vane rows.

A variable stator vane row group VSSG according to the present invention includes at least two directly adjacent stator vane rows. A vane of one of the member vane rows, together with at least one vane of its immediately downstream member vane row, can be provided on a common rotary base. Alternatively, at least two vanes appertaining to different member vane rows can also be arranged on an individual rotary base each.

Each of the blade row groups RSG, SSG and VSSG in accordance with the present invention can also have more than two member blade rows.

The described configuration of the blade row group includes the possibility that on at least one member blade row the distance between two adjacent blades varies along the circumference. It may also be favourable if the axial position of two adjacent blades of this blade row varies along the circumference. It may also be favourable if the profile depth of two adjacent blades of this blade row varies along the circumference.

It may be advantageous if the numbers of blades of two adjacent member blade rows are in a special ratio to each other, i.e. the number of blades of the member blade row (i) is a multiple of the number of blades of the member blade row (i+1), or the number of blades of the member blade row (i+1) is a multiple of the number of blades of the member blade row (i), or the number of blades of the member blade row (i) equals the number of blades of the member blade row (i+1). It may be particularly advantageous if the blade numbers of the rows (i) and (i+1) have a ratio of 1:2.

Figure 2:
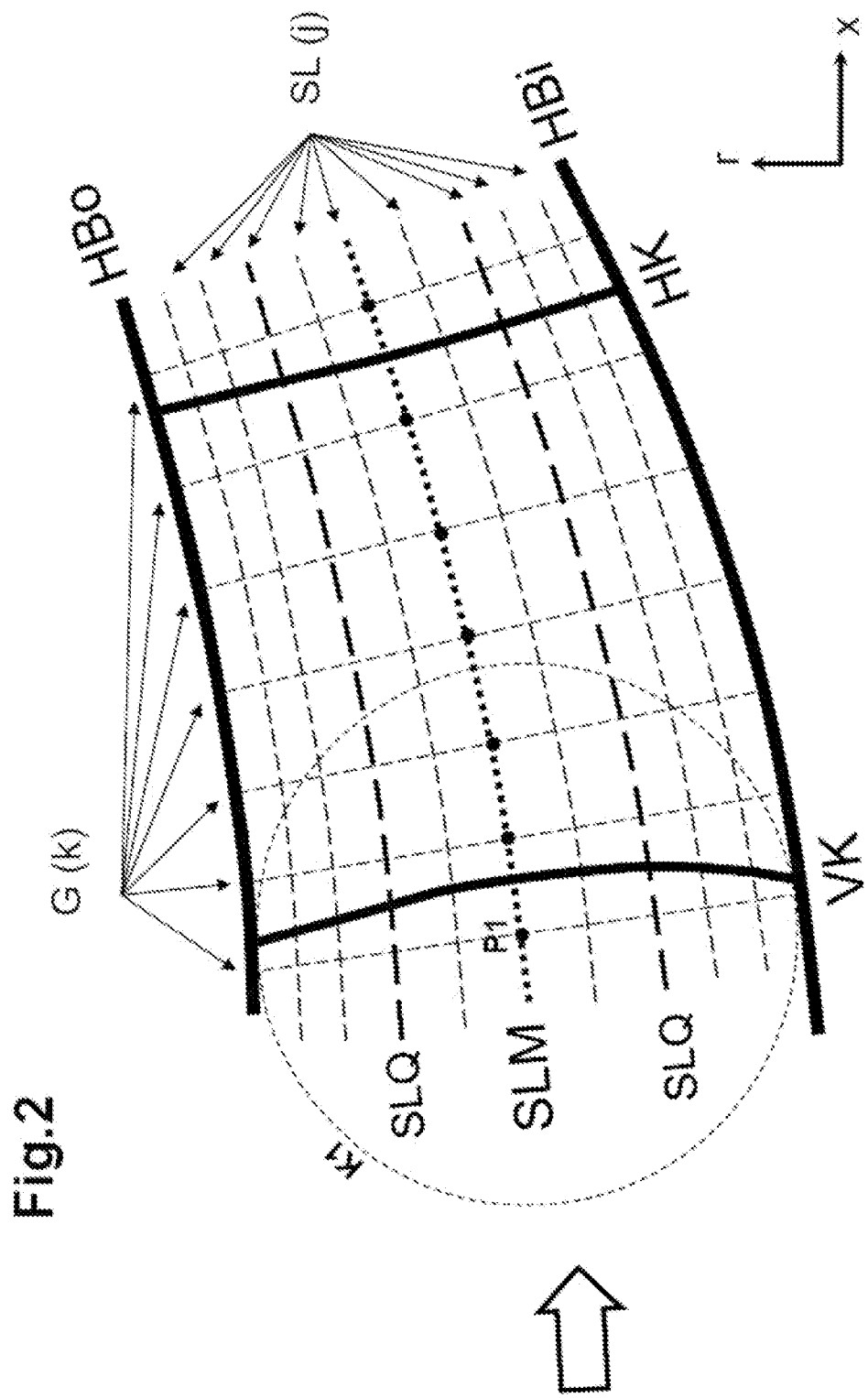
FIG. 2 shows the definition of meridional flow lines.

For the purpose of preparing definitions important in accordance with the present invention, FIG. 2 shows, for the definition of meridional flow lines, a main flow path of a fluid-flow machine with through-flow from left to right (indicated by the bold arrow), in the meridional plane established by the axial coordinate x and the radial coordinate r, where the main flow path is delimited by the radially inner main flow path boundary HBi and by the radially outer main flow path boundary HBo. The mean meridional flow line SLM is in the center between the radially inner main flow path boundary HBi and the radially outer main flow path boundary HBo. Its course matches the connection of the center points of circles inscribed in the main flow path, as is made clear by the example in the illustration for the first marked point P1 on the mean meridional flow line SLM and the appertaining circle K1. VK and HK indicate the leading edge and the trailing edge of a blade arranged in the main flow path.

There is a family of straight lines G(k) inside the main flow path whose members are each perpendicular to the mean meridional flow line SLM and end at the main flow path boundaries HB. Further meridional flow lines SL(j) are defined by the connection of points with an identical percentage subdivision of the straight lines G(k) between the main flow path boundaries HB in each case.

The rotation of a meridional flow line about the machine axis results in a meridional flow surface SF(j). The intersection of a meridional flow surface with a blade of the fluid-flow machine results in a meridional flow line section SLS(j). In the center between one of the main flow path boundaries HBi and HBo and the mean meridional flow line SLM, the quarter meridional flow line SLQ results in this way.

Figure 3:
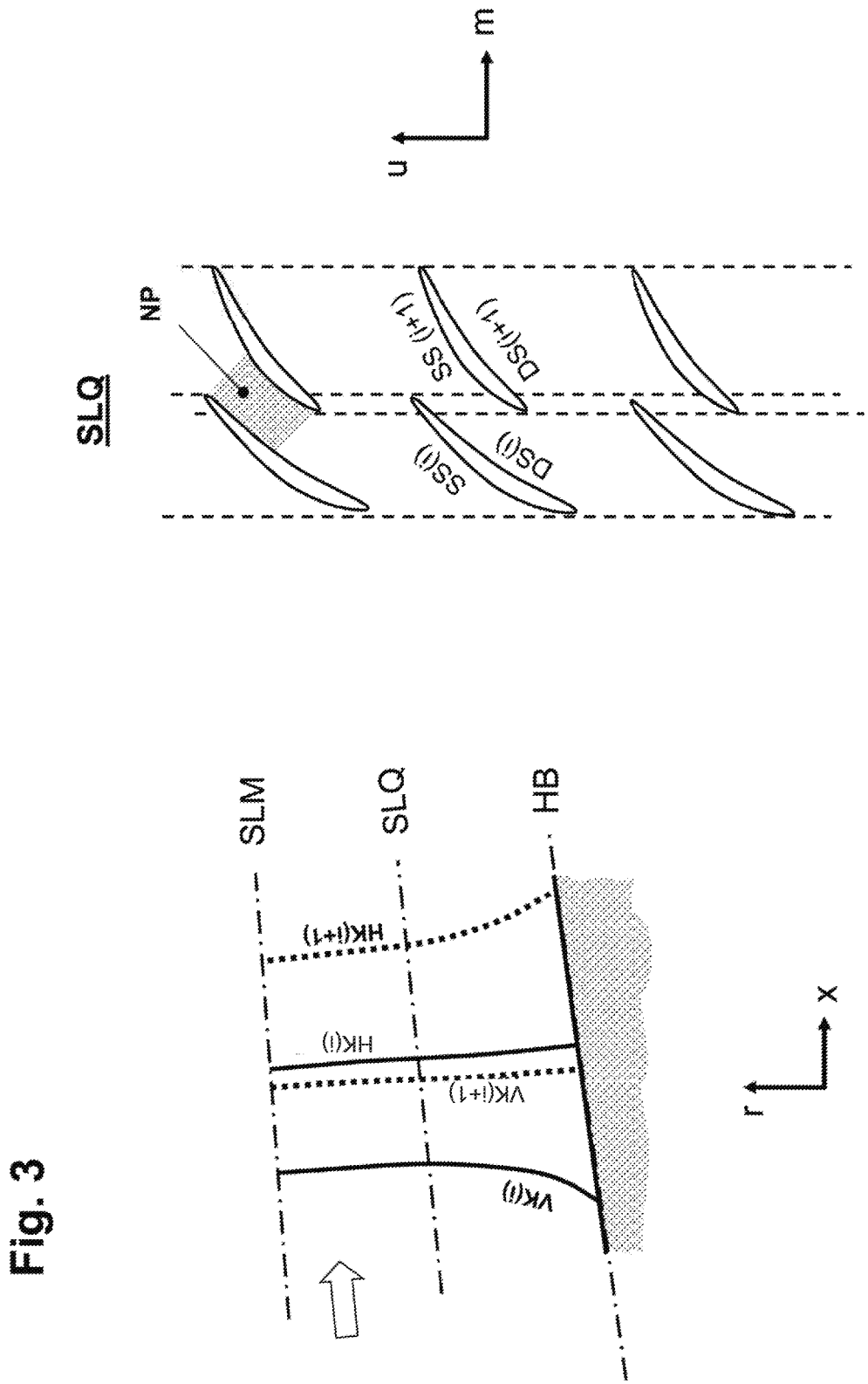
FIG. 3 shows a blade row group in accordance with the present invention including a circumferential view.

It can occur, depending on the blade shape, that the profile depths and blade edge shapes in the meridional plane (x,r) cannot be recorded quantitatively, or not at all. For that reason, they must be viewed in a profile chord direction-related coordinate system for stipulations in accordance with the invention. In this connection, FIG. 3 shows firstly on its left-hand side, by way of example, an arrangement of two adjacent member blade rows (i) and (i+1) appertaining to a blade row group in accordance with the invention in the meridional plane established by the axial direction x and the radial direction r. Shown is the inventive arrangement in the area between the main flow path center (mean meridional flow line SLM along the meridional direction m there) and a main flow path boundary HB. The main flow path boundary HB is a contour at the hub or at the casing of the fluid-flow machine, for example at a rotary base, a wall, a stator root, a stator shroud, a rotor root or a rotor shroud.

The main flow path boundary HB is either firmly connected to the end of at least one member blade row, or a gap is provided between the main flow path boundary and at least the end of a member blade row.

The arrangement shows the two member blade rows (i) and (i+1), each with two blade edges, leading edge VK(i) and trailing edge HK(i) or leading edge VK(i+1) and trailing edge HK(i+1).

The right-hand side of FIG. 3 shows the arrangement of the two member blade rows viewed in a meridional flow surface established by the meridional coordinate m and the circumferential direction u. An appropriate circumferential development is shown as an example for other meridional flow line sections on the mean meridional flow line blade section SLM in the main flow path center. For simplicity's sake (but not absolutely necessary in accordance with the invention), the two member blade rows here have the same blade numbers. Also advantageous is a blade number ratio of 1:2 for the rows (i) and (i+1), where every second blade of the row (i+1) can advantageously be arranged close to the pressure side of a blade of the row (i). The suction sides of the blades (i) and (i+1) are identified respectively with SS(i) and SS(i+1), and the pressure sides with DS(i) and DS(i+1).

The blades can advantageously be provided such that between the pressure side of a blade (i) and the suction side of a blade (i+1), a secondary passage (illustrated as a shaded area and identified with NP) is created.

It can be provided that in at least one area of the main flow path height from the leading edge VK(i+1) of the rear member blade row to the trailing edge HK(i) of the front member blade row a meridional meshing is provided whose amount increases in the direction of at least one of the main flow path boundaries HB in at least one partial section. A meridional meshing of this type can be provided for all exemplary embodiments of the invention.

Figure 4:
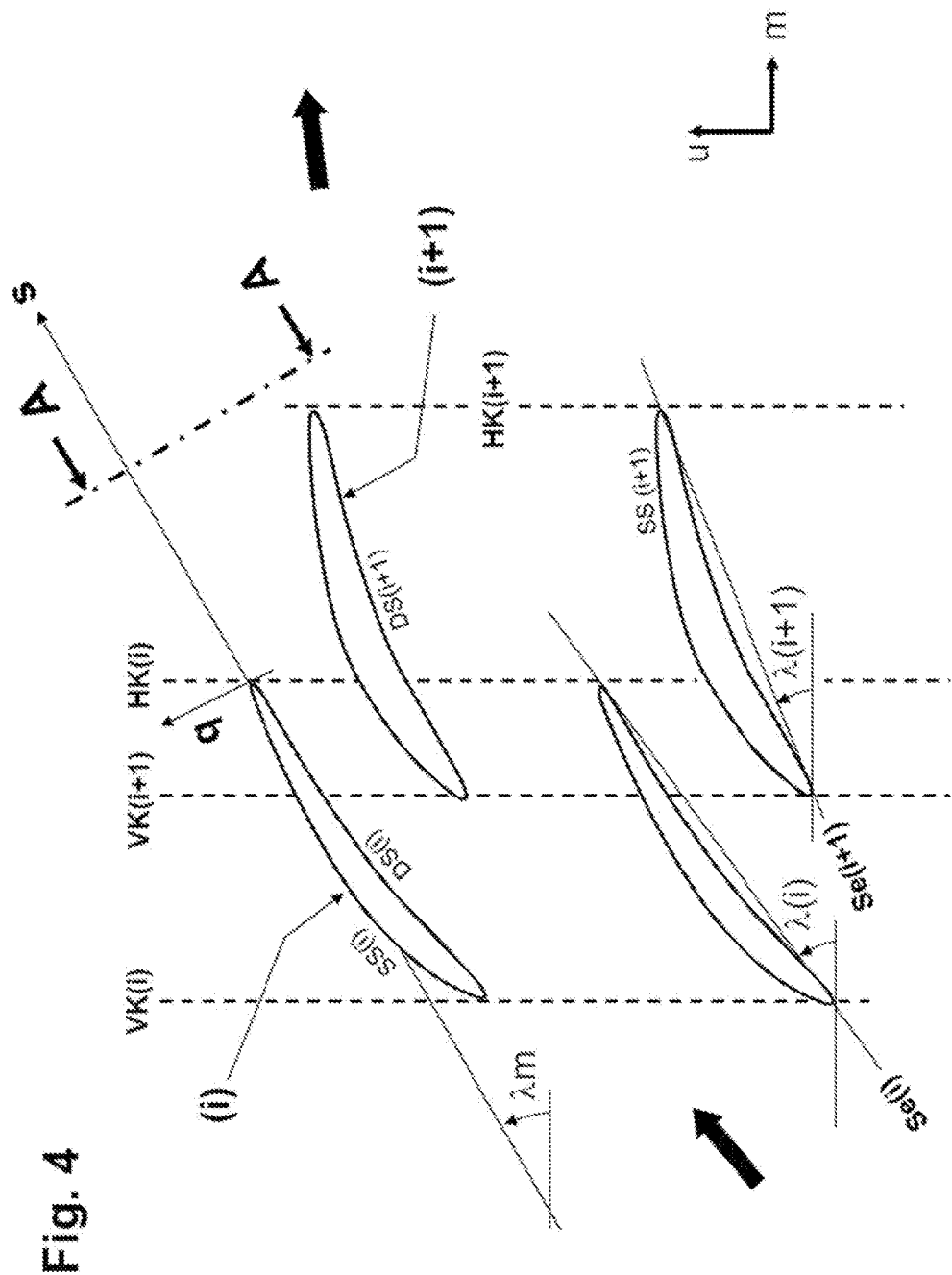
FIG. 4 shows definitions in accordance with the present invention in a meridional flow line section.

FIG. 4 shows, as does the right-hand side of FIG. 3, a meridional flow line blade section. The definitions of various relevant quantities and views in the plane established by the meridional direction m and by the circumferential coordinate u are provided. For simplification, only two blades and the intermediate blade main passage of the member blade rows (i) and (i−1) are shown in each case. The main flow direction is identified by bold black arrows. The connecting lines of the blade edges are accordingly identified with VK(i), HK(i), VK(i+1) and HK(i+1). Each blade profile is shown with its suction side SS and its pressure side DS. It is pointed out that for purposes of a clearer illustration in FIG. 4 and also in the other figures, no distinction is made between the identification of the member blade rows (i) and (i+1) and the identification of the individual blades in the member blade rows, i.e. the blades too are identified with (i) and (i+1).

The chord Se(i) of the front blade is defined as the tangent lying on the profile of the blade (i) on the pressure side. The chord Se(i+1) of the rear blade is defined as the tangent lying on the profile of the blade (i+1) on the pressure side.

The stagger angle of the front blade lambda(i) ($\lambda$i) is defined as the angle of inclination of the chord of the front blade S(i) relative to the meridional direction m. The stagger angle of the rear blade lambda(i+1) ($\lambda$i+1) is defined as the angle of inclination of the chord of the rear blade S(i+1) relative to the meridional direction m. The mean stagger angle lambdam ($\lambda$m) is defined as the mean value of the stagger angles lambda(i) and lambda(i+1) in accordance with: lambdam=(lambda(i)+lambda(i+1))/2.

The coordinate direction s is inclined with lambdam relative to the meridional direction m and faces downstream. The coordinate direction q is perpendicular to s, and its orientation leads away from the pressure side of the blade (i). The coordinate direction or is perpendicular to s and q.

For the definition of the view A-A, it is assumed that the meridional flow line blade section shown in FIG. 4 is located on the quarter meridional flow line SLQ. The mean chord direction identified by the coordinate direction s is representative of the local main flow direction in the flow-mechanical interference area of the blades (i) and (i+1). A fixed relationship to this aerodynamically identified and important mean chord direction is therefore essential for stipulating characteristic features of a blade row group that are correct in terms of flow mechanics. For this reason, the blade edges and their describing parameters are defined in the coordinate system (q-or). In view A-A all blade edges of a blade row pairing (i), (i+1) can be usefully assessed and described in terms of their flow-mechanical effect.

The view A-A is perpendicular to the mean chord direction—identified by the coordinate direction s—of the blade arrangement in the meridional flow line blade section on the quarter meridional flow line SLQ (in the q-or plane).

FIG. 5a shows as bold unbroken lines the edges VK(i) and HK(i) of the front blade and as bold dotted lines the edges VK(i+1) and HK(i+1) of the rear blade in the area between the main flow path boundary HB and the mean meridional flow line SLM defined with half the blade height, in the q-or plane (view A-A). At the two blade edges of the front blade the pressure side DS(i) and the suction side SS(i) are identified respectively. At the two blade edges of the rear blade the pressure side DS(i+1) and the suction side SS(i+1) are identified respectively. The main flow is directed towards the viewer; its direction is therefore indicated by a bold encircled point. In addition, the quarter meridional flow line SLQ is shown, where the coordinate origin is arranged at the intersection point of SLQ with the trailing edge of the front blade HK(i), and the coordinate direction or is orthogonal to the meridional flow surface passing through SLQ. The coordinate direction q extends parallel to the quarter meridional flow line SLQ. The coordinate direction or extends orthogonal to SLQ and not mandatorily parallel to HK(i). The main flow is directed towards the viewer, and its direction is therefore indicated by an encircled point.

FIG. 5b shows, by the example of the leading edge VK(i) the quantities required for the definition of the degree of bulge of a blade edge. The distance dor between SLM and HB is measured orthogonally to the quarter meridional flow line SLQ at the intersection point with the trailing edge line HK(i) (in the direction of or and perpendicular to q), with the auxiliary straight line GH having the SLQ-orthogonal direction. The maximum bulge of a blade edge d results as the greatest ascertainable distance between the respective blade edge itself and the straight connection of the blade edge points on SLM and at HB.

The degree of bulge WG of a blade edge is defined in accordance with WG1=d/dor.

The blade edges are divided in respect of their qualitative shape into different edge types:
Edge type A: a substantially linear course, characterized in that a very small degree of bulge of WG<0.003 is provided.
Edge type B: a slightly curved course, characterized in that a small degree of bulge of 0.003<WG<0.01 is provided.
Edge type C: an at least partially curved course, without curvature change and with a degree of bulge of WG>0.01, where a section having a concave curvature towards the blade pressure side is provided.
Edge type D: an at least partially curved course, without curvature change and with a degree of bulge of WG>0.01, where a section having a convex curvature towards the blade pressure side is provided (mirror-inverted with the same quality as Type C).

Edge type E: an at least partially curved course, with a curvature change and with a degree of bulge of WG>0.01, where a section having a concave curvature towards the blade pressure side is provided between the curvature change point and the main flow path boundary HB.

Edge type F: an at least partially curved course, with a curvature change and with a degree of bulge of WG>0.01, where a section having a convex curvature towards the blade pressure side is provided between the curvature change point and the main flow path boundary HB (mirror-inverted with the same quality as type E).

Edge type G: an at least partially curved course, with two curvature changes and with a degree of bulge of WG>0.01, where a section having a concave curvature towards the blade pressure side is provided between the two curvature change points.

Edge type H: an at least partially curved course, with two curvature changes and with a degree of bulge of WG>0.01, where a section having a convex curvature towards the blade pressure side is provided between the two curvature change points (mirror-inverted with the same quality as type G).

A qualitative equality of two edges exists when they are either of the same type (also referred to as unidirectional qualitative equality) or when two edges are of different types, but are derived from one another in mirror-inverted form, e.g. types C and D, types E and F or types G and H (also referred to as counter-directional qualitative equality).

FIGS. 5a and 5b show an illustration of the blade edges in view A-A, representing the ideal case for viewing the blade edges, but stipulations in dimensionally differing views of the blade row pairing with its four edges within an angular range of +/−45° about the coordinate direction s can also be helpful as long as the latter is orthogonal to the coordinate direction or. It is particularly appropriate here when the edges of the blade row group, regarding their properties, are viewed orthogonally to the coordinate directions q and or.

It is advantageous for the blade row group when the rear blade (i+1) is provided in the vicinity of the pressure side of the front blade (i), and all blade edges VK(i), VK(i+1) and HK(i+1) at least in a partial area between the mean meridional flow line SLM and the main flow path boundary HB are arranged on the pressure side of the blade edge HK(i).

It can furthermore be favourable when the blade edge VK(i+1) at least in a partial area between the mean meridional flow line SLM and the main flow path boundary HB is arranged on the pressure side of the blade edge VK(i).

It can be favourable here, when the blade edge VK(i+1) forms at least one intersection point with the blade edge VK(i), where it is advantageous when the blade edge VK(i+1) is arranged in an area adjoining the main flow path boundary HB on the pressure side of the blade edge VK(i). Alternatively it can be favourable here, when the blade edge VK(i+1) forms at least one intersection point with the blade edge VK(i), and the blade edge VK(i+1) in an area adjoining the main flow path boundary HB is arranged on the suction side of the blade edge VK(i). Alternatively it can be favourable when the blade edge VK(i+1) is arranged completely on the pressure side of the blade edge VK(i).

It can furthermore be favourable when the blade edge VK(i+1) is arranged completely on the suction side of the blade edge VK(i).

It can furthermore be favourable when the blade edge VK(i+1) is arranged completely between the blade edges VK(i) and HK(i).

It can furthermore be favourable when the blade edge HK(i+1) at least in a partial area between the mean meridional flow line SLM and the main flow path boundary HB is arranged on the pressure side of the blade edges VK(i) and VK(i+1). It can be advantageous here, when the blade edge HK(i+1) is arranged completely on the pressure side of the two blade edges VK(i) and VK(i+1).

It can be favourable here when all blade edges VK(i), VK(i+1) and HK(i+1) are arranged completely on the pressure side of the blade edge HK(i).

It can be favourable in accordance with the invention when at least two of the four blade edges of the blade row pairing (i, i+1) have a qualitative equality in respect of their edge type. It can be advantageous here when a unidirectional qualitative equality is provided.

It can furthermore be advantageous for the blade row group when a qualitative equality is provided for at least three of the four blade edges of the blade row pairing (i, i+1). It can be advantageous here when a unidirectional qualitative equality is provided.

It can furthermore be advantageous for the blade row group when a qualitative equality is provided for all four blade edges of the blade row pairing (i, i+1). It can be advantageous here when a unidirectional qualitative equality is provided.

It can furthermore be advantageous for the blade row group when a qualitative equality is provided for the blade edges HK(i) and VK(i+1). It can be advantageous here when a unidirectional qualitative equality is provided. Alternatively it can be advantageous when a counter-directional qualitative equality is provided.

It can furthermore be advantageous for the blade row group when a qualitative equality is provided for the blade edges VK(i) and VK(i+1). It can be advantageous here when a unidirectional qualitative equality is provided.

It can furthermore be advantageous for the blade row group when a qualitative equality is provided for the blade edges HK(i) and HK(i+1). It can be advantageous here when a unidirectional qualitative equality is provided.

It can furthermore be advantageous for the blade row group when a qualitative equality is provided for the blade edges VK(i) and HK(i+1). It can be advantageous here when a unidirectional qualitative equality is provided. Alternatively it can be advantageous when a counter-directional qualitative equality is provided, i.e. the blade edges are derived from one another in mirror-inverted form.

It can furthermore be advantageous when a qualitative equality of blade edges is provided in view A-A, perpendicular to the coordinate directions q and or. It can be advantageous here when a unidirectional qualitative equality is provided.

It is favourable when in view A-A at at least one of the edges HK(i) and VK(i+1) one of the edge types A, B, C, D, E and F is provided. It is advantageous here when at at least one of the edges HK(i) and VK(i+1) one of the edge types C, D, E and F is provided. It is additionally advantageous here when at the edge HK(i) an edge type E and at the edge VK(i+1) an edge type F is provided. Alternatively it can additionally be advantageous when at the edge HK(i) an edge type D and at the edge VK(i+1) an edge type C is provided. Alternatively it can additionally be advantageous when at the edge HK(i) an edge type E and at the edge VK(i+1) an edge type E is provided. Alternatively it can additionally be advantageous when at the edge HK(i) an edge type D and at the edge VK(i+1) an edge type D is provided.

It is favourable when in view A-A at at least one of the edges VK(i) and VK(i+1) one of the edge types A, B, C, D, E and F is provided. It is advantageous here when at at least one of the edges HK(i) and VK(i+1) one of the edge types C, D, E and F is provided. It is additionally advantageous here when at the edge HK(i) an edge type E and at the edge VK(i+1) an edge type F is provided. Alternatively it can additionally be advantageous when at the edge VK(i) an edge type D and at the edge VK(i+1) an edge type C is provided. Alternatively it can additionally be advantageous when at the edge HK(i) an edge type E and at the edge VK(i+1) an edge type E is provided. Alternatively it can additionally be advantageous when at the edge HK(i) an edge type D and at the edge VK(i+1) an edge type D is provided.

It is favourable when in view A-A at at least one of the edges VK(i) and HK(i+1) one of the edge types A, B, C, D, E and F is provided. It is advantageous here when at at least one of the edges HK(i) and HK(i+1) one of the edge types C, D, E and F is provided. It is additionally advantageous here when at the edge VK(i) an edge type C and at the edge VK(i+1) an edge type D is provided. Alternatively it can additionally be advantageous when at the edge VK(i) an edge type D and at the edge VK(i+1) an edge type D is provided. Alternatively it can additionally be advantageous when at the edge HK(i) an edge type F and at the edge VK(i+1) an edge type E is provided. Alternatively it can additionally be advantageous when at the edge HK(i) an edge type E and at the edge VK(i+1) an edge type E is provided.

Besides the edge shape types described in the above text, for the edge types with at least one curvature change, the position of the curvature change plays a role in favourably influencing the flow in the area close to the main flow path boundary.

It is favourable when in view A-A the point of the curvature change of at least one of the blade edges VK(i), HK(i), VK(i+1) and HK(i+1) is provided in the area between the quarter meridional flow line SLQ and the main flow path boundary HB. It is advantageous here when the point of the curvature change is provided closer to SLQ than to HB.

It is favourable when in view A-A the point of the curvature change for at least the leading edges VK(i) and VK(i+1) or the trailing edges HK(i) and HK(i+1) is provided in the area between the quarter meridional flow line SLQ and the main flow path boundary HB. It is advantageous here when the point of the curvature change is provided closer to SLQ than to HB.

It is favourable when in view A-A the point of the curvature change of all blade edges VK(i), HK(i), VK(i+1) and HK(i+1) is provided in the area between the quarter meridional flow line SLQ and the main flow path boundary HB. It is advantageous here when the point of the curvature change is provided closer to SLQ than to HB.

It can furthermore be favourable when in view A-A the point of the curvature change of at least one of the blade edges VK(i), HK(i), VK(i+1) and HK(i+1) is provided closer to HB than to SLQ. It is advantageous here when this applies to at least one of the leading edges VK(i) and VK(i−1).

It can furthermore be favourable when in view A-A the point of the curvature change for at least the leading edges VK(i) and VK(i+1) or the trailing edges HK(i) and HK(i+1) is provided closer to HB than to SLQ. It is advantageous here when this applies to the leading edges VK(i) and VK(i+1).

It can furthermore be favourable when in view A-A the point of the curvature change of all blade edges VK(i), HK(i), VK(i+1) and HK(i+1) is provided closer to HB than to SLQ.

It can also be favourable with structural restrictions when in view A-A the point of the curvature change of at least one of the blade edges VK(i), HK(i), VK(i+1) and HK(i+1) is provided in the area between the quarter meridional flow line SLQ and the mean meridional flow line SLM. It is advantageous here when the point of the curvature change is provided closer to SLQ than to SLM.

It can furthermore be favourable with structural restrictions when in view A-A the point of the curvature change for at least the leading edges VK(i) and VK(i+1) or the trailing edges HK(i) and HK(i+1) is provided in the area between the quarter meridional flow line SLQ and the mean meridional flow line SLM. It is advantageous here when the point of the curvature change is provided closer to SLQ than to SLM.

It can furthermore be favourable with structural restrictions when in view A-A the point of the curvature change of all blade edges VK(i), HK(i), VK(i+1) and HK(i+1) is provided in the area between the quarter meridional flow line SLQ and the mean meridional flow line SLM. It is advantageous here when the point of the curvature change is provided closer to SLQ than to SLM.

Also important for a flow-oriented design of the blade edges are the degrees of bulge and the relationships to one another of the four degrees of bulge involved.

First, the degrees of bulge are classified in respect of their size, with four classes being formed:

Class 1: very small degree of bulge in accordance with $0<WG<0.003$

Class 2: small degree of bulge in accordance with $0.003<WG<0.01$

Class 3: medium degree of bulge in accordance with $0.01<WG<0.05$

Class 4: high degree of bulge in accordance with $0.05<WG<0.2$

It is favourable in accordance with the invention when a degree of bulge of one of the classes 2, 3 and 4 is provided at the leading edge VK(i). It is advantageous here when a degree of bulge of one of the classes 3 and 4 is provided at VK(i). It is additionally advantageous here when a degree of bulge of class 3 is provided at VK(i).

It is furthermore favourable when a degree of bulge of one of the classes 1, 2, 3 and 4 is provided at the leading edge VK(i+1). It is advantageous here when a degree of bulge of one of the classes 1, 2 and 3 is provided at VK(i+1). It is additionally advantageous here when a degree of bulge of one of the classes 2 and 3 is provided at VK(i+1). It is particularly advantageous here when a degree of bulge of class 2 is provided at VK(i+1).

It is furthermore favourable when a degree of bulge of one of the classes 2, 3 and 4 is provided at the trailing edge HK(i). It is advantageous here when a degree of bulge of one of the classes 3 and 4 is provided at HK(i). It is additionally advantageous here when a degree of bulge of class 3 is provided at HK(i).

It is furthermore favourable when a degree of bulge of one of the classes 1, 2 and 3 is provided at the trailing edge HK(i+1). It is advantageous here when a degree of bulge of one of the classes 1 and 2 is provided at HK(i+1). It is additionally advantageous here when a degree of bulge of class 2 is provided at HK(i+1).

It is furthermore favourable when a degree of bulge of one of the classes 2 and 3 is provided at the leading edge VK(i) and a degree of bulge of one of the classes 1 and 2 at the trailing edge HK(i+1). It is advantageous here when a degree of bulge of class 2 is provided at VK(i) and a degree of bulge of class 2 at HK(i+1). It is additionally advantageous here when a degree of bulge of class 3 is provided at the edges HK(i) and VK(i+1).

It is furthermore favourable when a degree of bulge of one of the classes 1 and 2 is provided at the leading edge VK(i) and at the trailing edge HK(i+1). It is advantageous here when a degree of bulge of class 2 is provided at VK(i) and at HK(i+1). It is additionally advantageous here when a degree of bulge of class 3 is provided at the edges HK(i) and VK(i+1).

It is furthermore favourable when a degree of bulge of one of the classes 3 and 4 is provided at the leading edge VK(i) and at the trailing edge HK(i+1). It is advantageous here when a degree of bulge of class 4 is provided at VK(i) and a degree of bulge of class 3 at HK(i+1). It is additionally advantageous here when a degree of bulge of class 3 is provided at the edges HK(i) and VK(i+1).

It is furthermore favourable when a degree of bulge of one of the classes 1 and 2 is provided at the leading edge VK(i) and a degree of bulge of one of the classes 3 and 4 at the trailing edge HK(i+1). It is advantageous here when a degree of bulge of class 2 is provided at VK(i) and a degree of bulge of class 3 at HK(i+1). It is additionally advantageous here when a degree of bulge of class 3 is provided at the edges HK(i) and VK(i+1).

It is furthermore favourable when at at least two of the edges VK(i), HK(i), VK(i+1) and HK(i+1) degrees of bulge of the same class are provided. It can be advantageous here when the degrees of bulge at at least two of the edges are provided equally large within a tolerance of 0.02.

It is furthermore favourable when at the edges VK(i) and HK(i) degrees of bulge of the same class are provided. It is advantageous here when at the edges VK(i+1) and HK(i+1) degrees of bulge of the same class are provided too.

It is furthermore favourable when at the edges VK(i+1) and HK(i+1) degrees of bulge of the same class are provided. It is advantageous here when at the edges VK(i) and HK(i) degrees of bulge of a different or of the same class are provided.

It is furthermore favourable when at the edges VK(i) and HK(i+1) degrees of bulge of the same class are provided. It is advantageous here when at the edges VK(i+1) and HK(i) degrees of bulge of a different or of the same class are provided.

It is furthermore favourable when at the edges VK(i+1) and HK(i) degrees of bulge of the same class are provided. It is advantageous here when at the edges VK(i) and HK(i+1) degrees of bulge of a different or of the same class are provided.

It is furthermore favourable when at at least three of the edges VK(i), HK(i), VK(i+1) and HK(i+1) degrees of bulge of the same class are provided. It can be advantageous here when the degrees of bulge at at least three of the edges are provided equally large within a tolerance of 0.02.

It is furthermore favourable when at all edges VK(i), HK(i), VK(i+1) and HK(i+1) degrees of bulge of the same class are provided. It can be advantageous here when the degrees of bulge at all edges are provided equally large within a tolerance of 0.02.

It is furthermore favourable when
at the edge VK(i) a degree of bulge of class 4,
at the edge HK(i) a degree of bulge of class 2,
at the edge VK(i+1) a degree of bulge of class 4, and
at the edge HK(i+1) a degree of bulge of class 1 is provided.

It is furthermore favourable when
at the edge VK(i) a degree of bulge of class 1,
at the edge HK(i) a degree of bulge of class 1,
at the edge VK(i+1) a degree of bulge of class 4, and
at the edge HK(i+1) a degree of bulge of class 1 is provided.

It is furthermore favourable when
at the edge VK(i) a degree of bulge of class 4,
at the edge HK(i) a degree of bulge of class 1,
at the edge VK(i+1) a degree of bulge of class 1, and
at the edge HK(i+1) a degree of bulge of class 1 is provided.

It is furthermore favourable when
at the edge VK(i) a degree of bulge of class 3,
at the edge HK(i) a degree of bulge of class 2,
at the edge VK(i+1) a degree of bulge of class 2, and
at the edge HK(i+1) a degree of bulge of class 1 is provided.

It is furthermore favourable when
at the edge VK(i) a degree of bulge of class 2,
at the edge HK(i) a degree of bulge of class 2,
at the edge VK(i+1) a degree of bulge of class 3, and
at the edge HK(i+1) a degree of bulge of class 2 is provided.

It is furthermore favourable when
at the edge VK(i) a degree of bulge of class 2,
at the edge HK(i) a degree of bulge of class 2,
at the edge VK(i+1) a degree of bulge of class 4, and
at the edge HK(i+1) a degree of bulge of class 2 is provided.

It is furthermore favourable when
at the edge VK(i) a degree of bulge of class 2,
at the edge HK(i) a degree of bulge of class 2,
at the edge VK(i+1) a degree of bulge of class 3, and
at the edge HK(i+1) a degree of bulge of class 1 is provided.

It is furthermore favourable when
at the edge VK(i) a degree of bulge of class 2,
at the edge HK(i) a degree of bulge of class 2,
at the edge VK(i+1) a degree of bulge of class 4, and
at the edge HK(i+1) a degree of bulge of class 1 is provided.

It is furthermore favourable when
at the edge VK(i) a degree of bulge of class 2,
at the edge HK(i) a degree of bulge of class 1,
at the edge VK(i+1) a degree of bulge of class 3, and
at the edge HK(i+1) a degree of bulge of class 3 is provided.

It is furthermore favourable when
at the edge VK(i) a degree of bulge of class 2,
at the edge HK(i) a degree of bulge of class 2,
at the edge VK(i+1) a degree of bulge of class 3, and
at the edge HK(i+1) a degree of bulge of class 3 is provided.

It is furthermore favourable when
at the edge VK(i) a degree of bulge of class 2,
at the edge HK(i) a degree of bulge of class 3,
at the edge VK(i+1) a degree of bulge of class 4, and
at the edge HK(i+1) a degree of bulge of class 1 is provided.

Besides the quantities described in the above text, i.e. edge shape and degree of bulge, the positions of the maximum bulges play a role in favourably influencing the flow in the area close to the main flow path boundary.

It is favourable when in view A-A the point of maximum bulge of at least one of the blade edges VK(i), HK(i), VK(i+1) and HK(i+1) is provided in the area between the quarter meridional flow line SLQ and the main flow path boundary HB. It is advantageous here when the point of maximum bulge is provided closer to SLQ than to HB.

It is favourable when in view A-A the point of maximum bulge for at least the leading edges VK(i) and VK(i+1) or the trailing edges HK(i) and HK(i+1) is provided in the area between the quarter meridional flow line SLQ and the main flow path boundary HB. It is advantageous here when the point of maximum bulge is provided closer to SLQ than to HB.

It is favourable when in view A-A the point of maximum bulge of all blade edges VK(i), HK(i), VK(i+1) and HK(i+1) is provided in the area between the quarter meridional flow line SLQ and the main flow path boundary HB. It is advantageous here when the point of maximum bulge is provided closer to SLQ than to HB.

It can furthermore be favourable when in view A-A the point of maximum bulge of at least one of the blade edges VK(i), HK(i), VK(i+1) and HK(i+1) is provided closer to HB than to SLQ. It is advantageous here when this applies to at least one of the leading edges VK(i) and VK(i+1).

It can furthermore be favourable when in view A-A the point of maximum bulge for at least the leading edges VK(i) and VK(i+1) or the trailing edges HK(i) and HK(i+1) is provided closer to HB than to SLQ. It is advantageous here when this applies to the leading edges VK(i) and VK(i+1).

It can furthermore be favourable when in view A-A the point of maximum bulge of all blade edges VK(i), HK(i), VK(i+1) and HK(i+1) is provided closer to HB than to SLQ.

It can also be favourable with structural restrictions when in view A-A the point of maximum bulge of at least one of the blade edges VK(i), HK(i), VK(i+1) and HK(i+1) is provided in the area between the quarter meridional flow line SLQ and the mean meridional flow line SLM. It is advantageous here when the point of maximum bulge is provided closer to SLQ than to SLM.

It can furthermore be favourable with structural restrictions when in view A-A the point of maximum bulge for at least the leading edges VK(i) and VK(i+1) or the trailing edges HK(i) and HK(i+1) is provided in the area between the quarter meridional flow line SLQ and the mean meridional flow line SLM. It is advantageous here when the point of maximum bulge is provided closer to SLQ than to SLM.

It can furthermore be favourable with structural restrictions when in view A-A the point of maximum bulge of all blade edges VK(i), HK(i), VK(i+1) and HK(i+1) is provided in the area between the quarter meridional flow line SLQ and the mean meridional flow line SLM. It is advantageous here when the point of maximum bulge is provided closer to the quarter meridional flow line SLQ than to the mean meridional flow line SLM.

Basic features of the blade row group in accordance with the invention have been stipulated in the above text. In the following, the invention is specified in greater detail on the basis of examples. FIG. 6a to FIG. 6c each show in the partial illustrations X1 to X10 the four blade edges VK(i), HK(i), VK(i+1) and HK(i+1) of two adjacent blades i and i+1, arranged one behind the other, of two blade rows in a blade row group in accordance with the invention in view A-A according to FIG. 4, in the area between the mean meridional flow line SLM and the main flow path boundary HB. The quarter meridional flow line SLQ is shown halfway between the mean meridional flow line SLM and the main flow path boundary HB in each case.

The local angle of inclination of a blade edge on the mean meridional flow line SLM or at the main flow path boundary HB is here always measured clockwise from the respective edge by the shortest route to the mean meridional flow line SLM or to the main flow path boundary HB respectively (see partial illustration X1).

The partial illustration X1 of FIG. 6a shows a variant in accordance with the invention of a blade row group having the following features: each of the blade edges VK(i), VK(i+1) and HK(i+1) is provided completely on the pressure side of the trailing edge HK(i). It can be advantageous here, as shown, when the leading edge VK(i) is provided completely on the pressure side of the trailing edge HK(i). It can furthermore be advantageous here, when the leading edge VK(i+1) is provided completely on the pressure side of the leading edge VK(i). It can furthermore be advantageous here, when the trailing edge HK(i+1) is provided completely on the pressure side of the leading edge VK(i+1).

At least two edges have the same edge type, in the present case such that at VK(i) an edge type D and at HK(i) an edge type D is provided. It can be advantageous when unlike in the illustration, at VK(i+1) an edge type A and at HK(i+1) an edge type A is provided. It can be advantageous when the edges VK(i) and HK(i) have the point of maximum bulge in the area between SLQ and HB; in a special case, the point of maximum bulge can be provided on SLQ. It can however also be advantageous when at the edges VK(i+1) and HK(i+1) an edge type D is provided, so that all edges are of the same edge type. It can be advantageous here when the edges VK(i+1) and HK(i+1) have the point of maximum bulge in the area between SLQ and HB. It can additionally be advantageous when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges HK(i) and HK(i+1) move away from each other in an area adjoining HB in the direction of HB. It can be advantageous when the edges VK(i) and HK(i) approach each other in an area adjoining HB in the direction of HB. It can additionally be advantageous when the edges VK(i) and HK(i) are substantially parallel (within a tolerance of 2° of the local angle of inclination). It can additionally be advantageous when the edges VK(i+1) and HK(i+1) are substantially parallel (within a tolerance of 2° of the local angle of inclination). It can be favourable here when the four blade edges locally on SLM include a right angle with SLM (within a tolerance of 2° of the local angle of inclination). It can additionally be advantageous when an obtuse angle greater than 105° is provided locally at HB between the edge HK(i) and HB. It can additionally be advantageous when an angle between 85° and 105° is provided locally at HB between the edge VK(i+1) and HB. It can additionally be advantageous when an angle between 85° and 105° is provided locally at HB between HB and the respective edge VK(i) and HK(i+1) of HB.

The partial illustration X2 of FIG. 6a shows a variant in accordance with the invention of a blade row group having the following features: each of the blade edges VK(i), VK(i+1) and HK(i+1) is provided completely on the pressure side of the trailing edge HK(i). It can be advantageous here, as shown, when the leading edge VK(i) is provided completely on the pressure side of the trailing edge HK(i). It can furthermore be advantageous here, when the leading edge VK(i+1) is provided completely on the pressure side of the leading edge VK(i). It can furthermore be advantageous here, when the trailing edge HK(i+1) is provided completely on the pressure side of the leading edge VK(i+1).

At least two edges have the same edge type, in the present case such that at VK(i) an edge type A is provided, at HK(i) an edge type D, at VK(i+1) an edge type A and at HK(i+1) an edge type A. It can however also be advantageous when at the edge VK(i) an edge type D is provided, so that the front and the rear blade have the same edge types each. It can be advantageous here when the edges VK(i) and HK(i) have the point of maximum bulge in the area between SLQ and HB. It can additionally be advantageous, when the point of maximum bulge of at least one edge is provided closer to SLQ than to HB or SLM; in a special case, the point of maximum bulge can be provided on SLQ. It can be advantageous when the edges HK(i) and VK(i+1) move away from each other in an area adjoining HB in the direction of HB. It can be advantageous when the edges HK(i) and HK(i+1) move away from each other in an area adjoining HB in the direction of HB.

It can be advantageous when the edges VK(i) and HK(i) move away from each other in an area adjoining HB in the direction of HB. It can additionally be advantageous when the edges VK(i+1) and HK(i+1) are substantially parallel (within a tolerance of 2° of the local angle of inclination). It can additionally be advantageous when the edges VK(i) and VK(i+1) are substantially parallel (within a tolerance of 2° of the local angle of inclination). It can additionally be advantageous when the edges VK(i) and VK(i+1) are substantially congruent (within a tolerance of d/dor=0.01). It can be favourable here when the four blade edges locally on SLM include a right angle with SLM (within a tolerance of 2° of the local angle of inclination). It can additionally be advantageous when an obtuse angle greater than 105° is provided locally at HB between the edge HK(i) and HB. It can additionally be advantageous when an angle between 85° and 105° is provided locally at HB between HB and the respective edge VK(i), VK(i+1) and HK(i+1).

The partial illustration X3 of FIG. 6a shows a variant in accordance with the invention of a blade row group having the following features: each of the blade edges VK(i), VK(i+1) and HK(i+1) is provided completely on the pressure side of the trailing edge HK(i). At least two edges have the same edge type, in the present case such that at VK(i) an edge type D is provided, at HK(i) an edge type D, at VK(i+1) an edge type C and at HK(i+1) an edge type C, so that the front and the rear blade have the same edge types each. It can be advantageous here when the edges VK(i), HK(i), VK(i+1) and HK(i+1) have the point of maximum bulge in the area between SLQ and HB. It can additionally be advantageous, when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges VK(i) and VK(i+1) move away from each other in an area adjoining HB in the direction of HB. It can be advantageous when the edges HK(i) and HK(i+1) move away from each other in an area adjoining HB in the direction of HB. It can additionally be advantageous when the edges VK(i+1) and HK(i+1) are substantially parallel (within a tolerance of 2° of the local angle of inclination). It can additionally be advantageous when the edges VK(i) and HK(i) are substantially parallel (within a tolerance of 2° of the local angle of inclination). It can be favourable here when the four blade edges locally on SLM include a right angle with SLM (within a tolerance of 2° of the local angle of inclination). It can additionally be advantageous when an obtuse angle greater than 105° is provided locally at HB between HB and the respective edge VK(i) and HK(i). It can additionally be advantageous when an angle of less than 85° is provided locally at HB between HB and the respective edge VK(i+1) and HK(i+1).

The partial illustration X4 of FIG. 6a shows a variant in accordance with the invention of a blade row group having the following features: each of the blade edges VK(i), VK(i+1) and HK(i+1) is provided completely on the pressure side of the trailing edge HK(i). At least two edges have the same edge type, in the present case such that at VK(i) an edge type C is provided, at HK(i) an edge type D, at VK(i+1) an edge type C and at HK(i+1) an edge type C, so that three edges have the same edge type. It can be advantageous here when the edges VK(i), HK(i), VK(i+1) and HK(i+1) have the point of maximum bulge in the area between SLQ and HB. It can additionally be advantageous, when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges VK(i) and HK(i) move away from each other in an area adjoining HB in the direction of HB. It can be advantageous when the edges HK(i) and HK(i+1) move away from each other in an area adjoining HB in the direction of HB. It can additionally be advantageous when the edges VK(i+1) and HK(i+1) are substantially parallel (within a tolerance of 2° of the local angle of inclination). It can additionally be advantageous when the edges VK(i) and VK(i+1) are substantially parallel (within a tolerance of 2° of the local angle of inclination). It can additionally be advantageous when the edges VK(i) and VK(i+1) are substantially congruent (within a tolerance of d/dor=0.01). It can be favourable here when the four blade edges locally on SLM include a right angle with SLM (within a tolerance of 2° of the local angle of inclination). It can additionally be advantageous when an obtuse angle greater than 105° is provided locally at HB between HB and the edge HK(i). It can additionally be advantageous when an angle of less than 85° is provided locally at HB between HB and the respective edge VK(i), VK(i+1) and HK(i+1).

The partial illustration X5 of FIG. 6b shows a variant in accordance with the invention of a blade row group having the following features: each of the blade edges VK(i), VK(i+1) and HK(i+1) is provided completely on the pressure side of the trailing edge HK(i). It can be advantageous here when the trailing edge HK(i+1) is provided completely on the pressure side of the leading edges VK(i) and VK(i+1). It can be advantageous here when the leading edge VK(i+1) forms an intersection point with the leading edge VK(i), where as shown here an area adjoining SLM can be provided, in which the leading edge VK(i+1) is arranged on the suction side of the leading edge VK(i). It can furthermore be advantageous here, when the intersection point is provided in the area between SLQ and HB; in a special case, the intersection point can be provided closer to SLQ or even on SLQ.

At least two edges have the same edge type, in the present case such that at VK(i) an edge type E is provided, at HK(i) an edge type E, at VK(i+1) an edge type F and at HK(i+1) an edge type F, so that the front and the rear blade have edges of the same edge type each. It can be advantageous here when the edges VK(i), HK(i), VK(i+1) and HK(i+1) have the point of the curvature change in the area between SLQ and HB. It can additionally be advantageous, when the point of the curvature change of at least one edge is provided closer to SLQ than to HB or SLM; in a special case, the point of the curvature change can be provided on SLQ. It can also be advantageous when the point of the curvature change of at least one of the edges VK(i) and VK(i+1) coincides with the intersection point of the edges VK(i) and VK(i+1).

It can be advantageous when the edges HK(i) and VK(i+1) move away from each other in an area adjoining HB in the direction of HB. It can be advantageous when the edges HK(i+1) and HK(i) move away from each other in an area adjoining HB in the direction of HB. It can additionally be advantageous when the edges VK(i+1) and HK(i+1) are substantially parallel (within a tolerance of 2° of the local angle of inclination). It can additionally be advantageous when the edges VK(i) and HK(i) are substantially parallel (within a tolerance of 2° of the local angle of inclination). It can alternatively be advantageous with structural restrictions when the edges HK(i) and VK(i) move away from each other in an area adjoining HB in the direction of HB. It can furthermore be favourable when the four blade edges locally on SLM include a right angle with SLM (within a tolerance of 2° of the local angle of inclination). It can additionally be advantageous when an angle ranging from 75° to 105° is provided locally at HB between HB and the edge HK(i). It can additionally be advantageous when an angle ranging from 75° to 105° is provided locally at HB between HB and the respective edge VK(i), VK(i+1) and HK(i+1). It can additionally be advantageous when locally at HB between HB and at least one of the edges VK(i), HK(i), VK(i+1) and HK(i+1) a right angle is provided within a tolerance of 2° of the local angle of inclination.

The partial illustration X6 of FIG. 6b shows a variant in accordance with the invention of a blade row group having the following features: each of the blade edges VK(i), VK(i+1) and HK(i+1) is provided completely on the pressure side of the trailing edge HK(i). It can be advantageous here when the trailing edge HK(i+1) is provided completely on the pressure side of the leading edges VK(i) and VK(i+1). It can be advantageous here when the leading edge VK(i+1) forms an intersection point with the leading edge VK(i), where as shown here an area adjoining HB can be provided, in which the leading edge VK(i+1) is arranged on the suction side of the leading edge VK(i). It can furthermore be advantageous here, when the intersection point is provided in the area between SLQ and HB; in a special case, the intersection point can be provided closer to SLQ or even on SLQ.

At least two edges have a qualitative equality, in the present case such that at VK(i) an edge type C is provided, at HK(i) an edge type E, at VK(i+1) an edge type D and at HK(i+1) an edge type A. It can however also be advantageous when, as not graphically shown here, the trailing edge HK(i+1) is of the type F, so that the front and the rear blades have the same edge types in mirror-inverted form. It can be advantageous here when the edges HK(i) and HK(i+1) have the point of the curvature change in the area between SLQ and HB. It can additionally be advantageous, when the point of the curvature change of at least one edge is provided closer to SLQ than to HB or SLM; in a special case, the point of the curvature change can be provided on SLQ.

It can be advantageous here when the edges VK(i) and VK(i+1) have the point of maximum bulge in the area between SLQ and HB. It can additionally be advantageous when the point of maximum bulge of at least one edge is provided closer to SLQ than to HB or SLM; in a special case, the point of maximum bulge can be provided on SLQ.

It can also be advantageous when the point of maximum bulge of at least one of the edges VK(i) and VK(i+1) coincides with the intersection point of the edges VK(i) and VK(i+1). It can be advantageous when the edges HK(i) and VK(i+1) move away from each other in an area adjoining HB in the direction of HB. It can be advantageous when the edges HK(i+1) and HK(i) move away from each other in an area adjoining HB in the direction of HB. It can furthermore be advantageous when the edges HK(i) and VK(i) move away from each other in an area adjoining HB in the direction of HB. It can furthermore be favourable when the four blade edges locally on SLM include a right angle with SLM (within a tolerance of 2° of the local angle of inclination). It can additionally be advantageous when an angle ranging from 75° to 105° is provided locally at HB between HB and the edge HK(i). It can additionally be advantageous when an angle ranging from 75° to 105° is provided locally at HB between HB and the respective edge HK(i) and HK(i+1). It can additionally be advantageous when locally at HB between HB and at least one of the edges VK(i), HK(i), VK(i+1) and HK(i+1) a right angle is provided within a tolerance of 2° of the local angle of inclination.

The partial illustration X7 of FIG. 6b shows a variant in accordance with the invention of a blade row group having the following features: each of the blade edges VK(i), VK(i+1) and HK(i+1) is provided completely on the pressure side of the trailing edge HK(i). It can be advantageous here when the trailing edge HK(i+1) is provided completely on the pressure side of the leading edges VK(i) and VK(i+1). It can be advantageous here when the leading edge VK(i+1) is provided completely on the suction side of the leading edge VK(i).

At least two edges have a qualitative equality, in the present case such that at VK(i) an edge type C is provided, at HK(i) an edge type E, at VK(i+1) an edge type A and at HK(i+1) an edge type A. It can however also be advantageous when, as not graphically shown here, the leading edge VK(i+1) and the trailing edge HK(i+1) are of the type C, so that three blade edges have the same edge type. It can be advantageous here when the edge HK(i) has the point of the curvature change in the area between SLQ and HB. It can additionally be advantageous, when the point of the curvature change of at least one edge is provided closer to SLQ than to HB or SLM; in a special case, the point of the curvature change can be provided on SLQ.

It can be advantageous here when the edges VK(i), VK(i+1) and HK(i+1) have the point of maximum bulge in the area between SLQ and HB. It can additionally be advantageous when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges HK(i+1) and HK(i) move away from each other in an area adjoining HB in the direction of HB. It can furthermore be advantageous when the edges HK(i) and VK(i) move away from each other in an area adjoining HB in the direction of HB.

It can additionally be advantageous when at least two of the four blade edges locally on SLM include an obtuse angle greater than 95° with SLM. It can be favourable here when at least two of the four blade edges locally on SLM include an obtuse angle between 100° and 115° with SLM. It can additionally be advantageous when all four blade edges locally on SLM include an obtuse angle greater than 95° with SLM. It can be favourable here when all four blade edges locally on SLM include an obtuse angle between 100° and 115° with SLM.

It can additionally be advantageous when an angle ranging from 75° to 105° is provided locally at HB between HB and the edge HK(i). It can additionally be advantageous when an angle greater than 95° is provided locally at HB between HB and the respective edge VK(i+1) and HK(i+1).

It can additionally be advantageous when locally at HB between HB and the edge VK(i) an acute angle of less than 85° is provided.

The partial illustration X8 of FIG. 6*b* shows a variant in accordance with the invention of a blade row group having the following features: each of the blade edges VK(i), VK(i+1) and HK(i+1) is provided completely on the pressure side of the trailing edge HK(i). It can be advantageous here when the trailing edge HK(i+1) is provided completely on the pressure side of the leading edges VK(i) and VK(i+1). It can be advantageous here when the leading edge VK(i+1) is provided completely on the suction side of the leading edge VK(i).

At least two edges have a qualitative equality, in the present case such that at VK(i) an edge type C is provided, at HK(i) an edge type E, at VK(i+1) an edge type A and at HK(i+1) an edge type A. It can however also be advantageous when, as not graphically shown here, the leading edge VK(i+1) and the trailing edge HK(i+1) are of the type C, so that three blade edges have the same edge type. It can be advantageous here when the edge HK(i) has the point of the curvature change in the area between SLQ and HB. It can additionally be advantageous when the point of the curvature change of at least one edge is provided closer to SLQ than to HB or SLM; in a special case, the point of the curvature change can be provided on SLQ.

It can be advantageous here when the edges VK(i), VK(i+1) and HK(i+1) have the point of maximum bulge in the area between SLQ and HB. It can additionally be advantageous when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges HK(i+1) and HK(i) move away from each other in an area adjoining HB in the direction of HB. It can furthermore be advantageous when the edges HK(i) and VK(i) move away from each other in an area adjoining HB in the direction of HB.

It can additionally be advantageous when at least two of the four blade edges locally on SLM include an acute angle of less than 85° with SLM. It can be favourable here when at least two of the four blade edges locally on SLM include an acute angle between 65° and 80° with SLM. It can additionally be advantageous when all four blade edges locally on SLM include an acute angle of less than 85° with SLM. It can be favourable here when all four blade edges locally on SLM include an acute angle between 65° and 80° with SLM.

It can additionally be advantageous when an angle ranging from 75° to 105° is provided locally at HB between HB and the edge HK(i). It can additionally be advantageous when an angle of less than 85° is provided locally at HB between HB and the respective edge VK(i+1) and HK(i+1). It can additionally be advantageous when locally at HB between HB and the edge VK(i) an acute angle of less than 85° is provided.

The partial illustration X9 of FIG. 6*c* shows a variant in accordance with the invention of a blade row group having the following features: each of the blade edges VK(i), VK(i+1) and HK(i+1) is provided completely on the pressure side of the trailing edge HK(i). It can be advantageous here when the trailing edge HK(i+1) is provided completely on the pressure side of the leading edges VK(i) and VK(i+1). It can be advantageous here when the leading edge VK(i+1) forms an intersection point (graphically not shown) with the leading edge VK(i), where an area adjoining HB can be provided, in which the leading edge VK(i+1) is arranged on the suction side of the leading edge VK(i). It can furthermore be advantageous here, when the intersection point is provided in the area between SLQ and HB; in a special case, the intersection point can be provided closer to SLQ or even on SLQ. It can be advantageous with structural restrictions, as graphically shown here, when the leading edge VK(i+1) is provided completely on the suction side of the leading edge VK(i).

At least two edges have a qualitative equality, in the present case such that at VK(i) an edge type C is provided, at HK(i) an edge type E, at VK(i+1) an edge type C and at HK(i+1) an edge type C, so that three blade edges have the same edge type. It can be advantageous here when the edge HK(i) has the point of the curvature change in the area between SLQ and HB. It can additionally be advantageous, when the point of the curvature change of at least one edge is provided closer to SLQ than to HB or SLM; in a special case, the point of the curvature change can be provided on SLQ.

It can be advantageous here when the edges VK(i), VK(i+1) and HK(i+1) have the point of maximum bulge in the area between SLQ and HB. It can additionally be advantageous when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges HK(i+1) and HK(i) move away from each other in an area adjoining HB in the direction of HB. It can furthermore be advantageous when the edges HK(i) and VK(i) move away from each other in an area adjoining HB in the direction of HB.

It can additionally be advantageous when at least two of the four blade edges locally on SLM include an obtuse angle greater than 95° with SLM. It can be favourable here when at least two of the four blade edges locally on SLM include an obtuse angle between 100° and 115° with SLM. It can additionally be advantageous when all four blade edges locally on SLM include an obtuse angle greater than 95° with SLM. It can be favourable here when all four blade edges locally on SLM include an obtuse angle between 100° and 115° with SLM.

It can additionally be advantageous when an angle ranging from 75° to 105° is provided locally at HB between HB and the edge HK(i). It can additionally be advantageous when locally at HB between HB and at least one of the edges VK(i+1) and HK(i+1) a right angle is provided within tolerance of 2° of the local angle of inclination. It can additionally be advantageous when locally at HB between HB and the edge VK(i) an angle of less than 85° is provided.

The partial illustration X10 of FIG. 6*c* shows a variant in accordance with the invention of a blade row group having the following features: each of the blade edges VK(i), VK(i+1) and HK(i+1) is provided completely on the pressure side of the trailing edge HK(i). It can be advantageous here when the trailing edge HK(i+1) is provided completely on the pressure side of the leading edges VK(i) and VK(i+1). It can be advantageous here when the leading edge VK(i+1) forms an intersection point (graphically not shown) with the leading edge VK(i), where an area adjoining HB can be provided, in which the leading edge VK(i+1) is arranged on the suction side of the leading edge VK(i). It can furthermore be advantageous here, when the intersection point is provided in the area between SLQ and HB; in a special case, the intersection point can be provided closer to SLQ or even on SLQ. It can be advantageous with structural restrictions, as graphically shown here, when the leading edge VK(i+1) is provided completely on the suction side of the leading edge VK(i).

At least two edges have a qualitative equality, in the present case such that at VK(i) an edge type C is provided, at HK(i) an edge type E, at VK(i+1) an edge type D and at HK(i+1) an edge type D. It can be advantageous here when the edge HK(i) has the point of the curvature change in the area between SLQ and HB. It can additionally be advantageous, when the point of the curvature change of at least one edge is provided closer to SLQ than to HB or SLM; in a special case, the point of the curvature change can be provided on SLQ. It can be advantageous here when the edges VK(i), VK(i+1) and HK(i+1) have the point of maximum bulge in the area between SLQ and HB. It can additionally be advantageous when the point of maximum bulge of at least one edge is provided closer to SLQ than to HB or SLM; in a special case, the point of maximum bulge can be provided on SLQ.

It can be advantageous when the edges HK(i) and VK(i+1) move away from each other in an area adjoining HB in the direction of HB. It can be advantageous when the edges HK(i+1) and HK(i) move away from each other in an area adjoining HB in the direction of HB. It can furthermore be advantageous when the edges HK(i) and VK(i) move away from each other in an area adjoining HB in the direction of HB.

It can additionally be advantageous when at least two of the four blade edges locally on SLM include an acute angle of less than 85° with SLM. It can be favourable here when at least two of the four blade edges locally on SLM include an acute angle between 65° and 80° with SLM. It can additionally be advantageous when all four blade edges locally on SLM include an acute angle of less than 85° with SLM. It can be favourable here when all four blade edges locally on SLM include an acute angle between 65° and 80° with SLM.

It can additionally be advantageous when an angle ranging from 75° to 105° is provided locally at HB between HB and the edge HK(i). It can additionally be advantageous when a right angle is provided locally at HB between HB and at least one of the edges VK(i+1) and HK(i+1) within a tolerance of 2° of the local angle of inclination. It can additionally be advantageous when locally at HB between HB and the edge VK(i) an angle of less than 85° is provided.

It can furthermore be advantageous when in at least one area of the blade height adjoining one of the main flow path boundaries (hub and casing) between the front section of the suction side of a blade in a member blade row (i+1) and the rear section of the pressure side of a blade in a member blade row (i) a secondary passage is provided that guides the flow locally and favourably matches the interference behaviour of the member blade rows (i) and (i+1) along the blade height.

The present figure description describes the position and shape or the course of blade edges between the mean meridional flow line (SLM) and one of the main flow path boundaries (HB). To the other one of the two main flow path boundaries, it is possible starting from the mean meridional flow line (SLM) to achieve an appropriate position and shape or an appropriate course of the blade edges, where—relative to the mean meridional flow line (SLM)—both symmetrical and asymmetrical courses of the blade edges can be achieved.

An advantageous flow behaviour in a blade group in accordance with the invention can therefore result when in the area of the blade ends at hub and casing adjoining the respective main flow path boundary, in each case at least one of the features described in the above text is provided. It can be provided here that in the area of the hub and of the casing at least one identical feature or even completely identical features are provided.

What is claimed is:

1. A blade row group arrangeable in a main flow path of a fluid-flow machine, comprising:
    a quantity (N) of adjacent member blade rows arranged relative to one another in both a meridional direction (m) and a circumferential direction (u), with the quantity (N) of the member blade rows being greater than or equal to 2 and (i) designating a running index with values between 1 and the quantity (N), the quantity (N) of adjacent member blade rows including a front member blade row with front blades (i) each having a leading edge (VK(i)) and a trailing edge (HK(i)) and a rear member blade row with rear blades (i+1) each having a leading edge (VK(i+1)) and a trailing edge (HK(i+1)),
    where the blade row group has two main flow path boundaries (HB),
    where the leading edge (VK(i+1)) of at least one blade of the rear blades is positioned in a vicinity of a blade of the front blades,
    where the leading edges (VK(i) and VK(i+1)) of the front and rear blades and the trailing edges (HK(i) and HK(i+1)) of the front and rear blades of the member blade rows of the blade row group extend between the two main flow path boundaries (HB) and a mean meridional flow line (SLM) in the main flow path center,
    wherein, a plane is taken at a meridional flow line section established by the meridional direction (m) and by the circumferential coordinate (u), and when viewing the blade row group in the plane, a chord (Se(i)) of one of the front blades (i) is defined as a tangent lying on a profile of the one of the front blades (i) on a pressure side of the one of the front blades (i) and a chord (Se(i+1)) of one of the rear blades (i+1) is defined as a tangent lying on a profile of the one of the rear blades (i+1) on a pressure side of the one of the rear blades (i+1),
    where a stagger angle (lambda(i)) of the one of the front blades (i) and a stagger angle (lambda(i+1)) of the one of the rear blades (i+1) are defined as angles of inclination of the respective chord relative to the meridional direction (m),
    where a mean stagger angle (lambdam) is defined as a mean value of the stagger angle (lambda(i)) of the one of the front blades (i) and the stagger angle (lambda(i+1)) of the one of the rear blades (i+1), in accordance with lambdam=(lambda(i)+lambda(i+1))/2,
    an auxiliary coordinate system having a first, a second and a third coordinate direction (s, q, or), with the first coordinate direction (s) facing downstream at the angle lambdam relative to the meridional direction (m), the second coordinate direction (q), perpendicular to the first coordinate direction (s), facing away from the pressure side of the one of the front blades, and the third coordinate direction (or) being perpendicular to the first coordinate direction (s) and to the second coordinate direction (q), where a degree of bulge (WG) of the leading edges (VK(i) and (VK(i+1)) of the front and rear blades and the trailing edges (HK(i) and HK(i+1)) of the front and rear blades is defined as a greatest ascertainable distance (d) between a respective blade edge and a straight connection of blade edge points on the mean meridional flow line (SLM) and one of the two main flow path boundaries (HB) relative to a width (dor) measured perpendicular to the first coordinate direction (s) at the respective blade edge between the mean meridional flow line (SLM) and the one of the two main flow path boundaries (HB), in accordance with (WG)=(d)/(dor), and wherein in an area between the mean meridional flow line (SLM) and the one of the two main flow path boundaries (HB) in a view perpendicular to the third coordinate direction (or) and exactly along the first coordinate direction (s), the leading edge (VK(i)) of the one of the front blades (i), the leading edge (VK(i+1)) of the one of the rear blades (i+1), and the trailing edge (HK(i+1)) of the one of the rear blades (i+1) (i+1) are arranged, at least in a first portion of the area between the mean meridional flow line (SLM) and the one of the two main flow path boundaries (HB), to lie to the pressure side of the one of the front blades (i) at the blade trailing edge (HK(i)) of the one of the front blades (i).

2. The blade row group in accordance with claim 1, wherein, in the view perpendicular to the third coordinate direction (or) and exactly along the first coordinate direction (s), the leading edge (VK(i+1)) of the one of the rear blades (i+1) at least in a second portion of the area between the mean meridional flow line (SLM) and the one of the two main flow path boundaries (HB) is arranged to lie to the pressure side of the one of the front blades (i) at the leading edge (VK(i)) of the one of the front blades (i).

3. The blade row group in accordance with claim 2, wherein the leading edge (VK(i+1)) of the one of the rear blades (i+1) forms at least one intersection point with the leading edge (VK(i)) of the one of the front blades (i).

4. The blade row group in accordance with claim 2, wherein, in the view perpendicular to the third coordinate direction (or) and exactly along the first coordinate direction (s), the leading edge (VK(i+1)) of the one of the rear blades (i+1) is arranged to completely lie to the pressure side of the one of the front blades (i) at the leading edge (VK(i)) of the one of the front blades (i).

5. The blade row group in accordance with claim 2, wherein the first portion and the second portion of the area between the mean meridional flow line (SLM) and the one of the two main flow path boundaries (HB) overlap.

6. The blade row group in accordance with claim 1, wherein, in the view perpendicular to the third coordinate direction (or) and exactly along the first coordinate direction (s), the leading edge (VK(i+1)) of the one of the rear blades (i+1) is arranged to completely lie to a suction side of the one of the front blades (i) at the leading edge (VK(i)) of the one of the front blades (i).

7. The blade row group in accordance with claim 6, wherein, in the view perpendicular to the third coordinate direction (or) and exactly along the first coordinate direction (s), the leading edge (VK(i+1)) of the one of the rear blades (i+1) is arranged to completely lie between the leading and trailing edges (VK(i) and HK(i)) of the one of the front blades (i).

8. The blade row group in accordance with claim 1, wherein, in the view perpendicular to the third coordinate direction (or) and exactly along the first coordinate direction (s), the blade trailing edge (HK(i+1)) of the one of the rear blades (i+1) at least in a third portion of the area between the mean meridional flow line (SLM) and the one of the two main flow path boundaries (HB) is arranged to lie to the pressure side of the one of the front blades (i) at the leading edge (VK(i)) of the one of the front blades (i) and to the pressure side of the one of the rear blades (i+1) at the leading edge (VK(i+1)) of the one of the rear blades (i+1).

9. The blade row group in accordance with claim 8, wherein the first portion and the third portion of the area between the mean meridional flow line (SLM) and the one of the two main flow path boundaries (HB) overlap.

10. The blade row group in accordance with claim 1, wherein, in the view perpendicular to the third coordinate direction (or) and exactly along the first coordinate direction (s), the leading edge (VK(i)) of the one of the front blades (i), the leading edge (VK(i+1)) of the one of the rear blades (i+1), and the trailing edge (HK(i+1)) of the one of the rear blades (i+1) are arranged to completely lie to the pressure side of the one of the front blades (i) at the trailing edge (HK(i)) of the one of the front blades (i).

11. The blade row group in accordance with claim 1, wherein, in the view perpendicular to the third coordinate direction (or) and exactly along the first coordinate direction (s), at least two blade edges chosen from a set of blade edges including the leading edge of the one of the front blades (VK(i)), the trailing edge of the one of the front blades (HK(i)), the leading edge of the one of the rear blades (VK(i+1)) and the trailing edge of the one of the rear blades (HK(i+1)) have a qualitative equality with respect to their edge types, where the qualitative equality is defined as a same edge type or a same edge type when mirror-inverted, and where each blade edge (VK(i), HK(i), VK(i+1), HK(i+1)) of the set of blade edges has one edge type of a plurality of edge types that are defined by at least one chosen from a curvature of an edge contour, a quantity of curvature changes and the degree of bulge.

12. The blade row group in accordance with claim 11, wherein the qualitative equality of the at least two blade edges chosen from the leading edge of the one of the front blades (VK(i)), the trailing edge of the one of the front blades (HK(i)), the leading edge of the one of the rear blades (VK(i+1)) and trailing edge of the one of the rear blades (HK(i+1)) exists for blade edges of the at least two blade edges of different blade rows (i, i+1) of the blade row group.

13. The blade row group in accordance with claim 12, wherein the qualitative equality exists for the leading edge (VK(i)) of the one of the front blades (i) and the leading edge (VK(i+1)) of the one of the rear blades (i+1).

14. The blade row group in accordance with claim 12, wherein the qualitative equality exists for the trailing edge (HK(i)) of the one of the front blades (i) and the leading edge (VK(i+1)) of the one of the rear blades (i+1).

15. The blade row group in accordance with claim 12, wherein the qualitative equality exists for the trailing edge (HK(i)) of the one of the front blades (i) and the trailing edge (HK(i+1)) of the one of the rear blades (i+1).

16. The blade row group in accordance with claim 11, wherein the qualitative equality of at least two blade edges chosen from the leading edge (VK(i)) of the one of the front blades, the trailing edge (HK(i)) of the one of the front blades, the leading edge (VK(i+1)) of the one of the rear blades, and the trailing edge (HK(i+1)) of the one of the rear blades exists at a same blade row (i, i+1) of the blade row group.

17. The blade row group in accordance with claim 16, wherein the qualitative equality exists for the leading and trailing edges (VK(i)) and (HK(i)) of the one of the front blades (i).

18. The blade row group in accordance with claim 16, wherein the qualitative equality exists for the leading and trailing edges (VK(i+1)) and (HK(i+1)) of the one of the rear blades (i+1).

19. The blade row group in accordance with claim 11, wherein the qualitative equality exists for at least three of the leading and trailing edges chosen from the leading edge (VK(i)) of the one of the front blades, the trailing edge (HK(i)) of the one of the front blades, the leading edge (VK(i+1)) of the one of the rear blades, and the trailing edge (HK(i+1)) of the one of the rear blades.

20. The blade row group in accordance with claim 11, wherein the qualitative equality exists at all four of the leading edge (VK(i)) of the one of the front blades, the trailing edge (HK(i)) of the one of the front blades, the leading edge (VK(i+1)) of the one of the rear blades, and the trailing edge (HK(i+1)) of the one of the rear blades.

21. The blade row group in accordance with claim 11, wherein the leading edge of the one (VK(i)) of the one of the front blades, the trailing edge (HK(i)) of the one of the front blades, the leading edge (VK(i+1)) of the one of the rear blades, and the trailing edge (HK(i+1)) of the one of the rear blades are of the same edge type.

\* \* \* \* \*